(12) United States Patent
Rabnawaz et al.

(10) Patent No.: US 11,814,470 B2
(45) Date of Patent: Nov. 14, 2023

(54) OMNIPHOBIC POLYURETHANE COMPOSITIONS, RELATED ARTICLES, AND RELATED METHODS

(71) Applicant: BOARD OF TRUSTEES OF MICHIGAN STATE UNIVERSITY, East Lansing, MI (US)

(72) Inventors: Muhammad Rabnawaz, East Lansing, MI (US); Fahad Khan, East Lansing, MI (US); Nazim Uddin, East Lansing, MI (US)

(73) Assignee: BOARD OF TRUSTEES OF MICHIGAN STATE UNIVERSITY, East Lansing, MI (US)

( * ) Notice: Subject to any disclaimer, the term of this patent is extended or adjusted under 35 U.S.C. 154(b) by 0 days.

(21) Appl. No.: 17/471,337

(22) Filed: Sep. 10, 2021

(65) Prior Publication Data

US 2022/0064366 A1    Mar. 3, 2022

Related U.S. Application Data

(63) Continuation of application No. 16/764,255, filed as application No. PCT/US2018/061189 on Nov. 15, 2018, now Pat. No. 11,118,003.

(Continued)

(51) Int. Cl.
*C08G 18/78* (2006.01)
*C08G 18/20* (2006.01)
(Continued)

(52) U.S. Cl.
CPC ..... *C08G 18/7831* (2013.01); *C08G 18/2063* (2013.01); *C08G 18/2081* (2013.01);
(Continued)

(58) Field of Classification Search
None
See application file for complete search history.

(56) References Cited

U.S. PATENT DOCUMENTS

2004/0087759 A1   5/2004  Malik et al.
2006/0035091 A1   2/2006  Bruchmann et al.
(Continued)

FOREIGN PATENT DOCUMENTS

WO   WO-1993/001349 A1   1/1993
WO   WO-2008/138927 A1   11/2008
(Continued)

OTHER PUBLICATIONS

International Application No. PCT/US2018/061189, International Search Report and Written Opinion, dated Mar. 5, 2019.
(Continued)

*Primary Examiner* — Jeffrey D Washville
(74) *Attorney, Agent, or Firm* — MARSHALL, GERSTEIN & BORUN LLP

(57) ABSTRACT

The disclosure relates to a thermoset omniphobic composition, which includes a thermoset polymer with first, second, and third backbone segments, urethane groups linking the first and third backbone segments, and urea groups linking the first and second backbone segments. The first, second, and third backbone segments generally correspond to urethane or urea reaction products of polyisocyanate(s), amine-functional hydrophobic polymer(s), and polyol(s), respectively. The thermoset omniphobic composition has favorable omniphobic properties, for example as characterized by water and/or oil contact and/or sliding angles. The thermoset omniphobic composition can be used as a coating on any of a variety of substrates to provide omniphobic properties to a surface of the substrate. Such omniphobic coatings can be scratch resistant, ink/paint resistant, dirt-repellent, and optically clear. The thermoset omniphobic composition can be
(Continued)

applied by different coating methods including cast, spin, roll, spray and dip coating methods.

17 Claims, 3 Drawing Sheets

Related U.S. Application Data

(60) Provisional application No. 62/727,215, filed on Sep. 5, 2018, provisional application No. 62/586,430, filed on Nov. 15, 2017.

(51) Int. Cl.
| | |
|---|---|
| *C08G 18/24* | (2006.01) |
| *C08G 18/32* | (2006.01) |
| *C08G 18/40* | (2006.01) |
| *C08G 18/48* | (2006.01) |
| *C08G 18/61* | (2006.01) |
| *C08G 18/62* | (2006.01) |
| *C08G 18/65* | (2006.01) |
| *C08G 18/71* | (2006.01) |
| *C08G 18/73* | (2006.01) |
| *C08G 18/75* | (2006.01) |
| *C08G 18/76* | (2006.01) |
| *C08G 18/77* | (2006.01) |
| *C08G 18/79* | (2006.01) |
| *C09D 175/04* | (2006.01) |

(52) U.S. Cl.
CPC ....... *C08G 18/244* (2013.01); *C08G 18/3206* (2013.01); *C08G 18/4063* (2013.01); *C08G 18/4829* (2013.01); *C08G 18/61* (2013.01); *C08G 18/6216* (2013.01); *C08G 18/6517* (2013.01); *C08G 18/71* (2013.01); *C08G 18/73* (2013.01); *C08G 18/75* (2013.01); *C08G 18/76* (2013.01); *C08G 18/773* (2013.01); *C08G 18/792* (2013.01); *C09D 175/04* (2013.01); *C08G 2150/00* (2013.01)

(56) References Cited

U.S. PATENT DOCUMENTS

| | | |
|---|---|---|
| 2011/0042004 A1 | 2/2011 | Schubert et al. |
| 2016/0009971 A1* | 1/2016 | Wang ................ B32B 27/40 |
| | | 428/421 |
| 2016/0200937 A1 | 7/2016 | Hu et al. |
| 2020/0048459 A1 | 2/2020 | Rabnawaz |
| 2020/0347179 A1 | 11/2020 | Rabnawaz |

FOREIGN PATENT DOCUMENTS

| | | |
|---|---|---|
| WO | WO-2019/199713 A1 | 10/2019 |
| WO | WO-2020/142578 A1 | 7/2020 |
| WO | WO-2020/160089 A1 | 8/2020 |
| WO | WO-2020/167714 A1 | 8/2020 |
| WO | WO-2020/180760 A1 | 9/2020 |

OTHER PUBLICATIONS

U.S. Appl. No. 16/486,902, Rabnawaz et al., Methods for Forming Omniphobic Thermoset Compositions and Related Articles, filed Aug. 19, 2019.

U.S. Appl. No. 16/962,388, Rabnawaz et al., Omniphobically Coated Fluid Channels and Related Methods, filed Jul. 15, 2020.

U.S. Appl. No. 16/963,896, Rabnawaz et al., Omniphobic Polyurethane Compositions, Related Articles, and Related Methods, Jul. 22, 2020.

* cited by examiner

OMNIPHOBIC POLYURETHANE COMPOSITIONS, RELATED ARTICLES, AND RELATED METHODS

CROSS-REFERENCE TO RELATED APPLICATIONS

This application is a Continuation Application of U.S. application Ser. No. 16/764,255, filed May 14, 2020, which is a National Stage application of International Application No. PCT/US2018/061189, filed Nov. 15, 2018, which claims the benefit of U.S. Provisional Application No. 62/586,430 (filed Nov. 15, 2017) and U.S. Provisional Application No. 62/727,215 (filed Sep. 5, 2018), which are incorporated herein by reference in their entireties.

STATEMENT OF GOVERNMENT INTEREST

None.

BACKGROUND OF THE DISCLOSURE

Field of the Disclosure

The disclosure relates to a thermoset omniphobic composition (such as an omniphobic polyurethane composition) which includes a thermoset polymer with first, second, and third backbone segments, urethane groups linking the first and third backbone segments, and urea groups linking the first and second backbone segments. The first, second, and third backbone segments generally correspond to urethane or urea reaction products of polyisocyanate(s), amine-functional hydrophobic polymer(s), and polyol(s), respectively.

Brief Description of Related Technology

When water accumulates on a surface, the surface energy of the material is directly related to how the water will react. Some surfaces may allow the water to spread out into a pool with a large surface area, whereas others may make water bead up into droplets. The contact angle between the water droplet and the surface is used to characterize the surface into three categories: hydrophilic (<90°), hydrophobic (90°-150°), and superhydrophobic (>150°). FIG. 1 is a visual representation of a contact angle measurement.

Hydrophobicity can be achieved in two ways: controlling the chemical interactions between water and the material surface or altering the surface of the material. Generally, non-polar molecular groups are responsible water beading on a surface as opposed to spreading, due to the lower surface energies exhibited by non-polar groups. A lower surface energy of the material will directly relate to a high contact angle. In contrast, high-energy materials will cause water to spread out in a thin pool, as the polar groups present in surfaces with high energies attract the polar water molecules.

Physically altering the surface (e.g., increasing the roughness thereof) of the material may also increase the hydrophobicity of a material. By creating pillars or other similar features on a textured surface, water interacts with an increased surface area on the material, thus amplifying the chemical interactions between water and the surface. An image depicting how texturing the surface leads to increased contact angle can be seen below in FIG. 2.

A material that repels oils is known as oleophobic or lipophobic depending on if the repelling action is a physical or chemical property, respectively, and operates analogously to hydrophobic materials. These materials are often used on touch screen displays so that bodily oils and sweat gland secretions do not build up on the surface of a screen. A material that exhibits both hydrophobic and oleophobic properties is known as omniphobic. Such materials with very high contact angles are often regarded as "self-cleaning" materials, as contaminants will typically bead up and roll off the surface. As such, these materials have possible applications in screen display, window, and building material coatings.

Hu et al. U.S. Publication No. 2016/0200937 discloses polyurethane-based and epoxy-based compositions that be used as coatings and adhesives with abrasion-resistant, ink-resistant, anti-graffiti, anti-fingerprint properties. The disclosed process for making the compositions requires graft and block copolymer components along with a two-step/two-pot manufacturing process, increasing the time to manufacture and cost of the product.

SUMMARY

In one aspect, the disclosure relates to a thermoset omniphobic composition comprising: a thermoset polymer comprising a crosslinked backbone, the crosslinked backbone comprising: (i) first backbone segments (e.g., generally resulting from a polyisocyanate as described below), (ii) second backbone segments (e.g., generally resulting from a polysiloxane or other hydrophobic polymer as described below), (iii) third backbone segments (e.g., generally resulting from a polyol as described below), (iv) urethane groups linking first backbone segments and third backbone segments, and (v) urea groups linking first backbone segments and second backbone segments; wherein: the first backbone segments have a structure corresponding to at least one of a urethane reaction product and a urea reaction product from at least one polyisocyanate (e.g., a diisocyanate, a triisocyanate, a mixture of both); the second backbone segments have a structure corresponding to a urea reaction product from at least one amine-functional hydrophobic polymer having a glass transition temperature ($T_g$) of 50° C. or less; the third backbone segments have a structure corresponding to a urethane reaction product from at least one polyol; the urethane groups have a structure corresponding to a urethane reaction product of the polyisocyanate and the polyol; and the urea groups have a structure corresponding to a urea reaction product of the polyisocyanate and the amine-functional hydrophobic polymer.

Various refinements of the disclosed thermoset omniphobic composition are possible.

In a refinement, the polyisocyanate comprises a diisocyanate. In another refinement, the polyisocyanate comprises a triisocyanate. In another refinement, the polyisocyanate comprises a biobased polyisocyanate. In another refinement, the polyisocyanate is selected from the group consisting of 1,5-naphthylene diisocyanate, 4,4'-diphenylmethane diisocyanate (MDI), hydrogenated MDI, xylene diisocyanate (XDI), tetramethylxylol diisocyanate (TMXDI), 4,4'-diphenyl-dimethylmethane diisocyanate, di- and tetraalkyl-diphenylmethane diisocyanate, 4,4'-dibenzyl diiso-cyanate, 1,3-phenylene diisocyanate, 1,4-phenylene diisocyanate, one or more isomers of tolylene diisocyanate (TDI, such as toluene 2,4-diisocyanate), 1-methyl-2,4-diiso-cyanatocyclohexane, 1,6-diisocyanato-2,2,4-trimethyl-hexane, 1,6-diisocyanato-2,4,4-trimethylhexane, 1-iso-cyanatomethyl-3-isocyanato-1,5,5-trimethylcyclohexane, chlorinated and brominated diisocyanates, phosphorus-containing diisocyanates, 4,4'-diisocyanatophenyl-perfluoroethane, tetramethoxybutane 1,4-diisocyanate, butane 1,4-diisocyanate, hexane 1,6-diisocyanate (or hexamethylene diisocyanate; HDI), HDI dimer (HDID), HDI trimer (HDIT), HDI biuret, dicyclohexylmethane diisocyanate, cyclohexane 1,4-diisocyanate, ethylene diisocyanate, phthalic acid bisisocyanatoethyl ester, 1-chloromethylphenyl 2,4-diisocyanate, 1-bromomethylphenyl 2,6-diisocyanate, 3,3-bischloromethyl ether 4,4'-diphenyldiisocyanate, trimethylhexamethylene diisocyanate, 1,4-diisocyanato-butane, 1,2-diisocyanatododecane, and combinations thereof.

In a refinement, the amine-functional hydrophobic polymer is selected from the group consisting of amine-functional polysiloxanes, amine-functional polyperfluoroethers, amine-functional polybutadienes, amine-functional polyisobutylene ("PIB"), amine-functional branched polyolefins, amine-functional polyacrylates and polymethacrylates (e.g., also including $C_2$-$C_{16}$ pendant alkyl groups), and combinations thereof. In another refinement, the amine-functional hydrophobic polymer comprises a monoamine-functional polysiloxane. In another refinement, the amine-functional hydrophobic polymer comprises a diamine-functional polysiloxane. In another refinement, the amine-functional hydrophobic polymer comprises an amine-functional polyperfluoroether. In another refinement, the amine-functional hydrophobic polymer comprises an amine-functional polybutadiene. In another refinement, the amine-functional hydrophobic polymer comprises an amine-functional polyisobutene. In another refinement, the amine-functional hydrophobic polymer comprises an amine-functional branched polyolefin. In another refinement, the amine-functional hydrophobic polymer comprises an amine-functional poly(meth)acrylate. In another refinement, amine-functional polysiloxanes, amine-functional polyperfluoroethers, amine-functional polybutadienes, amine-functional polyisobutylene ("PIB"), amine-functional branched polyolefins, amine-functional polyacrylates and polymethacrylates, and other amine-functional hydrophobic polymers can be used with a low melting melting point (e.g., melting point from 0-60° C.) hydrophilic polymer/oligomer such as amine-functional poly(ethylene glycol) methyl ether ("PEO").

In a refinement, the amine-functional hydrophobic polymer has a glass transition temperature in a range from −150° C. to 50° C. In another refinement, the amine-functional hydrophobic polymer is a liquid at a temperature in a range from −20° C. or 10° C. to 40° C.

In a refinement, the amine-functional hydrophobic polymer has a molecular weight ranging from 300 to 50,000 g/mol.

In a refinement, the polyol comprises a diol. In another refinement, the polyol comprises a triol. In another refinement, the polyol comprises three or more hydroxyl groups. In another refinement, the polyol comprises a biobased polyol. In another refinement, the polyol is selected from the group consisting of polyether polyols, hydroxlated (meth)acrylate oligomers, glycerol, ethylene glycol, diethylene glycol, triethylene glycol, tetraethylene glycol, propylene glycol, dipropylene glycol, tripropylene glycol, 1,3-propanediol, 1,3-butanediol, 1,4-butanediol, neopentyl glycol, 1,6-hexanediol, 1,4-cyclohexanedimethanol, glycerol, trimethylolpropane, 1,2,6-hexanetriol, pentaerythritol, (meth)acrylic polyols, polyester polyols, polyurethane polyols, and combinations thereof.

In a refinement, the first backbone segments are present in an amount ranging from 10 wt. % to 90 wt. % relative to the thermoset polymer. In another refinement, the second backbone segments are present in an amount ranging from 0.01 wt. % to 20 wt. % relative to the thermoset polymer. In another refinement, the third backbone segments are present in an amount ranging from 10 wt. % to 90 wt. % relative to the thermoset polymer.

In a refinement, the thermoset polymer crosslinked backbone further comprises: fourth backbone segments having a structure corresponding to at least one of a urethane reaction product and a urea reaction product of at least one monoisocyanate monomer. In a further refinement, the fourth backbone segments can be present in an amount ranging from 0.01 wt. % to 4 wt. % relative to the thermoset polymer.

In a refinement, the composition further comprises one or more additives selected from the group consisting of nanoclay, graphene oxide, graphene, silicon dioxide (silica), aluminum oxide, cellulose nanocrystals, carbon nanotubes, titanium dioxide (titania), diatomaceous earth, biocides, pigments, dyes, thermoplastics, and combinations thereof.

In a refinement, the composition has a water contact angle in a range from 90° to 120°. In another refinement, the composition has an oil contact angle in a range from 0° or 1° to 65°. In another refinement, the composition has a water sliding angle in a range from 0° or 1° to 30° for a 75 µl droplet. In another refinement, the composition has an oil sliding angle in a range from 0° or 1° to 20° for a 10 µl or 25 µl droplet. In the case of compositions further including one or more nanofillers (e.g., nanoclay, graphene oxide, graphene, silicon dioxide (silica), aluminum oxide, cellulose nanocrystals, carbon nanotubes, titanium dioxide), the contact angles suitably can range from 100° to 150° for water, and from 20° to 120° for oil. Similarly, the sliding angles for water on the surface of nanofiller-containing compositions can range from 0° or 1° to 20° for a 25 µl droplet.

In a refinement, the composition has a composite structure comprising: a solid matrix comprising the first backbone segments and the third backbone segments; and liquid nanodomains comprising the second backbone segments, the liquid nanodomains being distributed throughout the solid matrix and having a size of 80 nm or less.

In another aspect, the disclosure relates to a coated article comprising: (a) a substrate; and (b) a thermoset omniphobic composition according to any of the variously disclosed embodiments, coated on a surface of the substrate.

Various refinements of the disclosed coated article are possible.

In a refinement, the substrate is selected from the group of metal, plastics, a different thermoset material, glass, wood, fabric (or textile), and ceramics.

In a refinement, the thermoset omniphobic composition has a thickness ranging from 0.01 µm to 500 µm.

In a refinement, the thermoset omniphobic composition coating is scratch-resistant, ink-resistant, dirt-repellent, and optically clear. For example, the coating can have a scratch resistance value of 7-10, 8-10, 9-10, or 10 as evaluated by the "Scratch Resistance" method described below. Similarly, the coating can have an ink resistance value of 7-10, 8-10, 9-10, or 10 as evaluated by the "Permanent Ink Resistance" method described below.

In another aspect, the disclosure relates to a method for forming a thermoset omniphobic composition, the method comprising: (a) reacting at least one polyisocyanate, at least one amine-functional hydrophobic polymer having a glass transition temperature ($T_g$) of 50° C. or less, and at least one polyol to form a partially crosslinked reaction product; and (b) curing the partially crosslinked reaction product to form the thermoset omniphobic composition (e.g., as described above and/or according to any of the variously disclosed embodiments).

Various refinements of the disclosed method are possible.

In a refinement, the method comprises reacting the at least one polyisocyanate, the at least one amine-functional hydrophobic polymer, and the at least one polyol to form the partially crosslinked reaction product (i) at temperature from 20° C. or 40° C. to 80° C. or 100° C. and (ii) for a time from 5 min to 300 min. In a further refinement, the method comprises curing the partially crosslinked reaction product to form the thermoset omniphobic composition (i) at temperature from 20° C. to 30° C. and (ii) for a time from 4 hr to 240 hr. In a further refinement, the method comprises reacting the at least one polyisocyanate, the at least one amine-functional hydrophobic polymer, and the at least one polyol to form the partially crosslinked reaction product in a reaction solvent comprising one or more of a ketone (or mixtures of ketones), an ester (or mixtures of esters), dimethyl formamide, and dimethyl carbonate.

In a refinement, the method comprises mixing while reacting the at least one polyisocyanate, the at least one amine-functional hydrophobic polymer, and the at least one polyol to form the partially crosslinked reaction product In a refinement, reacting the at least one polyisocyanate, the at least one amine-functional hydrophobic polymer, and the at least one polyol to form the partially crosslinked reaction product comprises: reacting the at least one polyisocyanate and the at least one amine-functional hydrophobic polymer in the absence of the at least one polyol to form an initial reaction product; and reacting the at least one polyol with the initial reaction product to form partially crosslinked reaction product.

In a refinement, curing the partially crosslinked reaction product to form the thermoset omniphobic composition comprises: adding a casting solvent to the partially crosslinked reaction product; applying the casting solvent and the partially crosslinked reaction product to a substrate; drying the substrate to remove the casting solvent, thereby forming a coating of the partially crosslinked reaction product on the substrate; and curing the coating of the partially crosslinked reaction product on the substrate, thereby forming a coating of the thermoset omniphobic composition on the substrate. In a further refinement, the method comprises performing one or more of spraying, casting, rolling, and dipping to apply the casting solvent and the partially crosslinked reaction product to the substrate.

In a refinement, curing the partially crosslinked reaction product to form the thermoset omniphobic composition comprises: applying the partially crosslinked reaction product to a substrate; drying the substrate, thereby forming a coating of the partially crosslinked reaction product on the substrate; and curing the coating of the partially crosslinked reaction product on the substrate, thereby forming a coating of the thermoset omniphobic composition on the substrate. In a further refinement, the method comprises performing one or more of spraying, casting, rolling, and dipping to apply the partially crosslinked reaction product to the substrate. In another refinement, the method comprises reacting the at least one polyisocyanate, the at least one amine-functional hydrophobic polymer, and the at least one polyol to form the partially crosslinked reaction product in a reaction solvent; applying the partially crosslinked reaction product in the reaction solvent to a substrate; and drying the substrate, thereby removing at least some of the reaction solvent and forming a coating of the partially crosslinked reaction product on the substrate.

While the disclosed methods and compositions are susceptible of embodiments in various forms, specific embodiments of the disclosure are illustrated (and will hereafter be described) with the understanding that the disclosure is intended to be illustrative, and is not intended to limit the claims to the specific embodiments described and illustrated herein.

BRIEF DESCRIPTION OF THE DRAWINGS

For a more complete understanding of the disclosure, reference should be made to the following detailed description and accompanying drawings wherein.

DETAILED DESCRIPTION

The disclosure relates to a thermoset omniphobic composition which includes a thermoset polymer with first, second, and third backbone segments, urethane groups linking the first and third backbone segments, and urea groups linking the first and second backbone segments. The first, second, and third backbone segments generally correspond to urethane or urea reaction products of polyisocyanate(s), amine-functional hydrophobic polymer(s), and polyol(s), respectively. The thermoset omniphobic composition has favorable omniphobic properties, for example as characterized by water and/or oil contact and/or sliding angles. The thermoset omniphobic composition can be used as a coating on any of a variety of substrates to provide omniphobic properties to a surface of the substrate. Such omniphobic coatings can be scratch resistant, ink/paint resistant (e.g., as an anti-graffiti coating), and/or optically clear.

The disclosed composition includes a polymer which can be used as a coating with the ability to bind to metal, glass, wood, fabrics, and ceramics with relative ease, in particular due to the strong adhesive properties of its urethane group constituents. The polymer coating has an omniphobic quality, repelling water, oils, inks, and spray paints, thus allowing for a coating that not only has typical hydrophobic and oleophobic properties, but also protects a surface from pen inks and various paints. The final polymer product is optically clear (even for relatively thick coatings), making it an ideal choice for coating computer and phone screens as well as windows. The polymer can be manufactured without fluorine as a component and/or as a one-pot reaction process, thus reducing the overall cost when compared to products currently manufactured. Coatings formed from the polymer composition are durable due to the final crosslinked thermoset matrix. The composition can be used in water-repellent, oil-repellent, anti-fingerprint, anti-smudge, and/or anti-graffiti coatings or paints.

Omniphobic Composition

Figure 3:
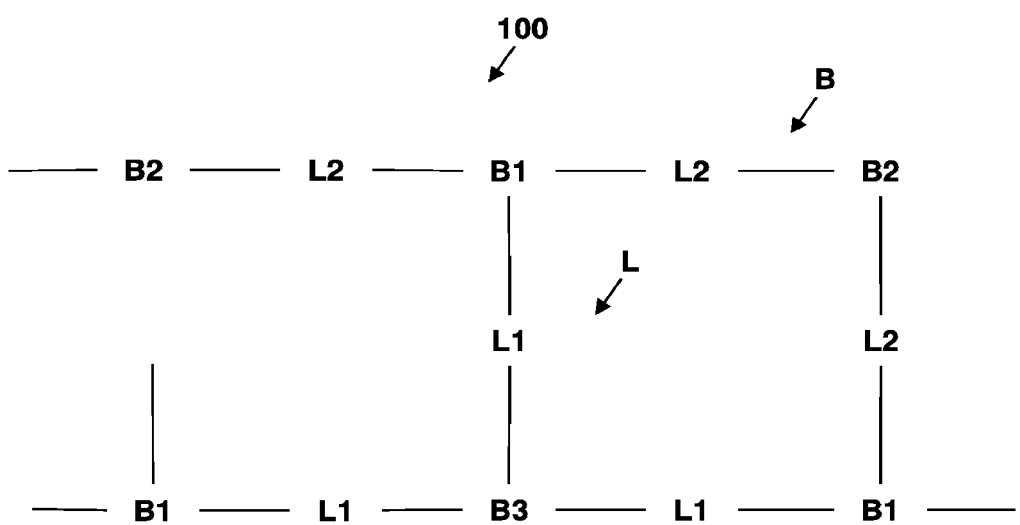
FIG. 3 illustrates a thermoset omniphobic composition according to the disclosure.

FIG. 3 illustrates a thermoset omniphobic composition according to the disclosure. FIG. 3 qualitatively illustrates various backbone segments (B) and linking groups (L) in a crosslinked thermoset polymer 100. The thermoset polymer 100 includes a crosslinked backbone B, which in turn includes (i) first backbone segments B1, (ii) second backbone segments B2, (iii) third backbone segments B3, (iv) urethane (or carbamate) linking groups L1 linking first backbone segments and third backbone segments, and (v) urea linking groups L2 linking first backbone segments and second backbone segments. As described in more detail below, the first backbone segments B1 generally result from a polyisocyanate (e.g., monomer, oligomer, or polymer), the second backbone segments B2 generally result from a polysiloxane or other hydrophobic polymer, and the third backbone segments B3 generally result from a polyol (e.g., monomer, oligomer, or polymer). The urethane (or carbamate) linking groups L1 can be represented by the general structure —$NR_1$—C(=O)O—, where $R_1$ can be H or a $C_1$-$C_{12}$ linear, branched, or cyclic substituted or unsubstituted hydrocarbon group, such as an aliphatic (e.g., alkyl, alkenyl) group or an aromatic group, or a combination of different $R_1$ groups (such as when multiple different reactive components are used). The urea linking groups L2 can be represented by the general structure —$NR_2$—C(=O)—$NR_3$—, where $R_2$ and $R_3$ independently can be H or a $C_1$-$C_{12}$ linear, branched, or cyclic substituted or unsubstituted hydrocarbon group, such as an aliphatic (e.g., alkyl, alkenyl) group or an aromatic group, or a combination of different $R_2$ and/or $R_3$ groups (such as when multiple different reactive components are used).

The first backbone segments B1 generally have a structure corresponding to at least one of a urethane reaction product and a urea reaction product from at least one polyisocyanate (e.g., diisocyanate, triisocyanate, or higher degree of isocyanate functionality) with a polyol (urethane) or an amine-functional hydrophobic polymer (urea). The first backbone segments B1 can result from a single polyisocyanate (e.g., a diisocyanate, a triisocyanate) species or a blend of two or more different polyisocyanate species with the same or different degree of isocyanate functionality.

The second backbone segments B2 have a structure corresponding to a urea reaction product from at least one amine-functional hydrophobic polymer having a glass transition temperature ($T_g$) of 50° C. or less (e.g., monoamine-functional, diamine-functional, or higher degree of amine functionality) and a polyisocyanate. In various embodiments, the amine-functional hydrophobic polymer has a glass transition temperature in a range from −150° C. to 50° C. (e.g., at least −150° C., −120° C., −100° C., or −50° C. and/or up to −10° C., 0° C., 10° C., 20° C., 30° C., 40° C., or 50° C.). The amine-functional hydrophobic polymer can be either in a liquid or a rubbery state at common use temperatures of the final coating, for example in a range from 10° C. to 40° C. or 20° C. to 30° C. In various embodiments, the amine-functional hydrophobic polymer is a liquid at a temperature in a range from 10° C. to 40° C. (e.g., from 20° C. to 30° C., or about room temperature, such as where the amine-functional hydrophobic polymer has a melting temperature ($T_m$) below 10° C. or 20° C.). The amine groups can be terminal and/or pendant from the hydrophobic polymer. In an embodiment, the amine groups are terminal groups on a hydrophobic polymer (e.g., linear hydrophobic polymer with one or two terminal amine groups). The second backbone segments B2 can result from a single amine-functional hydrophobic polymer species or a blend of two or more different amine-functional hydrophobic polymer species with the same or different degree of amine functionality. The amine-functional hydrophobic polymers can generally include one or more of amine-functional polysiloxanes, amine-functional polyperfluoroethers, amine-functional polybutadienes, amine-functional poly(ethylene glycol) methyl ether ("PEO"), amine-functional polyisobutylene ("PIB"), amine-functional branched polyolefins, amine-functional polyacrylates and polymethacrylates (e.g., also including $C_2$-$C_{16}$ pendant alkyl groups), and any other hydrophobic polymer with a glass transition temperature of 50° C. or less. In an embodiment, the amine-functional hydrophobic polymers, the second backbone segments B2, and/or the corresponding omniphobic composition can be free from fluorine or fluorinated components (e.g., not using amine-functional polyperfluoroethers or other fluorine-containing components during synthesis).

The third backbone segments B3 have a structure corresponding to a urethane reaction product from at least one polyol (e.g., diol, triol, or higher degree of hydroxyl functionality) and a polyisocyanate. The third backbone segments B3 can result from a single polyol species or a blend of two or more different polyol species with the same or different degree of hydroxyl functionality.

The urethane (or carbamate) groups L1 have a structure corresponding to a urethane reaction product of the polyisocyanate and the polyol, and the urea groups L2 have a structure corresponding to a urea reaction product of the polyisocyanate and the amine-functional hydrophobic polymer.

The polyisocyanate is not particularly limited and generally can include any aromatic, alicyclic, and/or aliphatic isocyanates having at least two reactive isocyanate groups (—NCO). Suitable polyisocyanates contain on average 2-4 isocyanate groups. In some embodiments, the polyisocyanate includes a diisocyanate. In some embodiments, the polyisocyanate includes triisocyanate. Suitable diisocyanates can have the general structure (O=C=N)—R—(N=C=O), where R can include aromatic, alicyclic, and/or aliphatic groups, for example having at least 2, 4, 6, 8, 10 or 12 and/or up to 8, 12, 16, or 20 carbon atoms. Examples of specific polyisocyanates include 1,5-naphthylene diisocyanate, 4,4'-diphenylmethane diisocyanate (MDI), hydrogenated MDI, xylene diisocyanate (XDI), tetramethylxylol diisocyanate (TMXDI), 4,4'-diphenyl-dimethylmethane diisocyanate, di- and tetraalkyl-diphenylmethane diisocyanate, 4,4'-dibenzyl diiso-cyanate, 1,3-phenylene diisocyanate, 1,4-phenylene diisocyanate, one or more isomers of tolylene diisocyanate (TDI, such as toluene 2,4-diisocyanate), 1-methyl-2,4-diiso-cyanatocyclohexane, 1,6-diisocyanato-2,2,4-trimethyl-hexane, 1,6-diisocyanato-2,4,4-trimethyl-hexane, 1-iso-cyanatomethyl-3-isocyanato-1,5,5-trimethyl-cyclohexane, chlorinated and brominated diisocyanates, phosphorus-containing diisocyanates, 4,4'-diisocyanatophenyl-perfluoroethane, tetramethoxybutane 1,4-diisocyanate, butane 1,4-diisocyanate, hexane 1,6-diisocyanate (or hexamethylene diisocyanate; HDI), HDI dimer (HDID), HDI trimer (HDIT), HDI biuret, dicyclohexylmethane diisocyanate, cyclohexane 1,4-diisocyanate, ethylene diisocyanate, phthalic acid bisisocyanatoethyl ester, 1-chloromethylphenyl 2,4-diisocyanate, 1-bromomethylphenyl 2,6-diisocyanate, 3,3-bischloromethyl ether 4,4'-diphenyldiisocyanate, trimethylhexamethylene diisocyanate, 1,4-diisocyanato-butane, 1,2-diisocyanatododecane, and combinations thereof. The polyisocyanate can be biobased or made of synthetic feedstock. Examples of suitable biobased polyisocyanates include pentamethylene diisocyanate trimer, and polyisocyanates formed from base compounds to which isocyanate groups are attached (e.g., via suitable derivatization techniques), including isocyanate-terminated poly(lactid acid) having two or more isocyanate groups, isocyanate-terminated poly(hydroxyalkanaotes) having two or more isocyanate groups, isocyanate-terminated biobased polyesters having two or more isocyanate groups.

The amine-functional hydrophobic polymer is not particularly limited and generally can include any hydrophobic polymer with glass transition temperature of 50° C. or less, such as in a range from −150° C. to 50° C. Examples of general classes of amine-functional hydrophobic polymers include amine-functional polysiloxanes, amine-functional polyperfluoroethers, amine-functional polybutadienes, amine-functional polyolefins (e.g., polyethylene, polypropylene, polybutylene), and combinations or mixtures thereof. The amine groups in the amine-functional hydrophobic polymers can include one or both of a primary amine and a secondary amine (e.g., $R^1NH_2$ and $R^1R^2NH$, respectively, where $R^1$ and $R^2$ can be the same or different groups other than hydrogen, for example hydrocarbon groups). The amine-functional polyperfluoroether (e.g., amine-functional polyperfluoropolyethers) can include mono-, di-, or higher amine functional polyperfluoroethers, or a blend of thereof, such as a blend of mono- and diamine-functional polyperfluorothers. The amine-functional polybutadiene can include mono-, di-, or higher amine functional polybutadienes, or a blend of thereof, such as a blend mono- and diamine-functional polybutadienes. Many suitable amine-functional hydrophobic polymers are commercially available (e.g., amine-functional PDMS with a variety of available degrees of functionality and molecular weights). Hydrophobic polymers that are not commercially available in their amine-functional form can be amine functionalized using conventional chemical synthesis techniques, for example including but not limited to hydroamination, thiol-ene Michael reaction of amine-carrying thiols, Mitsunobu reaction, and reductive amination.

The amine-functional polysiloxane is not particularly limited and generally can include any polysiloxane having mono-, di-, or higher amine functionality. In some embodiments, the amine-functional polysiloxane includes a monoamine-functional polysiloxane. In some embodiments, the amine-functional polysiloxane includes a diamine-functional polysiloxane. The polysiloxane can be a polydialklylsiloxane having —Si($R_1R_2$)—O— repeat units, where $R_1$ and $R_2$ independently can be $C_1$-$C_{12}$ linear or branched alkyl groups, $C_4$-$C_{12}$ cycloalkyl groups, unsubstituted aromatic groups, or substituted aromatic groups, in particular where $R_1$ and $R_2$ are methyl groups for a polydimethylsiloxane (PDMS). The amine groups are suitably terminal amine groups, for example in a polydialklylsiloxane represented by $NH_2$—$R_3$—[Si($R_1R_2$)—O]x-$R_3$—$NH_2$ for a diamine or $NH_2$—$R_3$—[Si($R_1R_2$)—O]X—$R_3$ for a monoamine, where $R_3$ independently can be H (when a terminal group) or $C_1$-$C_{12}$ linear or branched alkyl (when a terminal group or a linker for a terminal amine). The amine groups additionally can be pendant amine groups, for example in a polydialklylsiloxane represented by $R_3$—[Si($R_1R_2$)—O]X—[Si($R_{1'}R_{2'}$)—O]$_x$—$R_3$, where $R_{1'}$ and $R_{2'}$ independently can be the same as $R_1$ and $R_2$, but at least one or both of $R_{1'}$ and $R_{2'}$ independently is a $C_1$-$C_{12}$ linear or branched alkyl linker group with a terminal amine group (e.g., —$NH_2$). Some examples of polyslioxanes with amine group(s) include amine-bearing polydimethylsiloxane, amine-bearing polymethylphenylsiloxane, and amine-bearing polydiphenylsiloxane.

Some examples of polyperfluoropolyethers with amine group(s) include amine-bearing poly(n-hexafluoropropylene oxide) (—($CF_2CF_2CF_2O$)n-)$NH_2$) and amine-bearing poly (hexafluoroisopropylene oxide) (—(CF($CF_3$)$CF_2O$)n$NH_2$ or PFPO—$NH_2$). Some examples of amine-bearing atactic polyolefins include amine-bearing poly(1-butene), branched polyethylene, poly(cis-isoprene), poly(trans-isoprene), and poly (1-octene). Some examples of amine-bearing polyacrylates include poly(3-amino propyl acrylate). Similarly, mono-functional amine-bearing polymers include monoamine polyisobutylene (PIB—$NH_2$), monoamine polypolyethylene glycol (PEG-$NH_2$), monoamine poly(1-butene) (PB—$NH_2$, cis and trans) can also be used as the low-glass transition temperature ($T_g$ less than 50° C.) polymers, either alone or in combination with other amine-functional hydrophobic polymers.

The amine-functional hydrophobic polymer can have any suitable molecular weight in view of desired glass transition temperature, for example having a molecular weight ranging from 300 to 50,000 g/mol. In various embodiment, the molecular weight can be at least 300, 800, 1000, 1500, or 2000 and/or up to 1000, 2000, 3000, 5000, or 50,000 g/mol. The molecular weight can be expressed as a number-average or weight-average value in the units of gram/mole (g/mol). Some embodiments can include a blend of two or more amine-functional hydrophobic polymers with different average molecular weights, such as one with 300-1500 g/mol and another with 1500-50,000 g/mol with a higher average molecular weight than the first. Blends of amine-functional hydrophobic polymers (e.g., differing in molecular weight and/or in degree of functionality) can improve the combination of water- and oil-repellency properties of the final composition. For example, a monoamine-functional polysiloxane can provide better water and oil repellency than a diamine-functional polysiloxane. Low MW amine-functional polysiloxanes (e.g., PDMS, such as having a MW range of about 800-1200 g/mol or an average MW of about 1000 g/mol) can provide an improved water repellency, while Higher MW amine-functional polysiloxanes (e.g., PDMS, such as about 2000 g/mol or above for an average or range of MW) can provide an improved oil repellency.

The polyol is not particularly limited and generally can include any aromatic, alicyclic, and/or aliphatic polyols with at least two reactive hydroxyl/alcohol groups (—OH). Suitable polyol monomers contain on average 2-4 hydroxyl groups on aromatic, alicyclic, and/or aliphatic groups, for example having at least 4, 6, 8, 10 or 12 and/or up to 8, 12, 16, or 20 carbon atoms. In some embodiments, the polyol is a diol. In some embodiments, the polyol is a triol. Examples of specific polyols include one or more of polyether polyols (e.g., polypropylene oxide-based triols such as commercially available MULTRANOL 4011 with a MW of about 300), triethanolamine, hydroxlated (meth)acrylate oligomers (e.g., 2-hydroxylethyl methacrylate or 2-hydroxyethyl acrylate), glycerol, ethylene glycol, diethylene glycol, triethylene glycol, tetraethylene glycol, propylene glycol, dipropylene glycol, tripropylene glycol, 1,3-propanediol, 1,3-butanediol, 1,4-butanediol, neopentyl glycol, 1,6-hexanediol, 1,4-cyclohexanedimethanol, glycerol, trimethylolpropane, 1,2,6-hexanetriol, pentaerythritol, (meth) acrylic polyols (e.g., having random, block, and/or alternating hydroxyl functionalities along with other (meth) acrylic moieties), polyester polyols, and/or polyurethane polyols. The polyol can be biobased or made of synthetic feedstock. Examples of suitable biobased polyols include isosorbide, poly(lactic acid) having two or more hydroxyl groups, poly(hydroxyalkanaotes) having two or more hydroxyl groups, and biobased poly(esters) having two or more hydroxyl groups (e.g., as terminal groups).

In some embodiments, at least one of the polyisocyanate and the polyol is a tri- or higher functional isocyanate or alcohol/hydroxy compound, respectively, to promote crosslinking of the backbone segments in the final thermoset polymer. Alternatively or additionally, in some embodiments, the amine-functional hydrophobic polymer is a tri- or higher amine-functional compound (e.g., tri-functional amine PDMS) so that the hydrophobic polymer can serve as a crosslinker, either alone or in combination with polyisocyanate and/or polyol crosslinkers.

The first, second, and third backbone segments can be incorporated into the thermoset polymer in a variety of relative weight amounts. In an embodiment, the first backbone segments are present in an amount ranging from 10 wt. % to 90 wt. % relative to the thermoset polymer (e.g., at least 10, 15, or 20 wt. % and/or up to 30, 40, 50, 60, 70, 80, or 90 wt. %; such as 30 wt. % to 70 wt. %), which amounts can equivalently correspond to the polyisocyanate(s), for example as added to a reaction mixture and relative to all monomeric, oligomeric, and polymeric reaction components added thereto. In an embodiment, the second backbone segments are present in an amount ranging from 0.01 wt. % to 20 wt. % relative to the thermoset polymer (e.g., at least 0.01, 0.1, 0.2, 0.5, 1, 2, 3, or 5 wt. % and/or up to 3, 5, 8, 10, 15 or 20 wt. %; such as 0.2 wt. % to 8 wt. % or 1 wt. % to 5 wt. %), which amounts can equivalently correspond to the amine-functional hydrophobic polymer(s), for example as added to a reaction mixture and relative to all monomeric, oligomeric, and polymeric reaction components added thereto. In an embodiment, the third backbone segments are present in an amount ranging from 10 wt. % to 90 wt. % relative to the thermoset polymer (e.g., at least 10, 20, 30, 40, or 50 wt. % and/or up to 70, 80, or 90 wt. %, such as 30 wt. % to 70 wt. %), which amounts can equivalently correspond to the polyol monomer(s), for example as added to a reaction mixture and relative to all monomeric, oligomeric, and polymeric reaction components added thereto.

Similarly, the first, second, and third backbone segments can be incorporated into the thermoset polymer in a variety of relative molar amounts based on the corresponding reactive functional groups of their corresponding monomeric, oligomeric, and polymeric reaction components. Suitably, approximately a 1:1 molar ratio of combined hydroxy and amino functional groups (from the polyol(s) and amine-functional hydrophobic polymer(s), respectively) relative to isocyanate groups (from the polyisocyanate(s)) is used when combining reactive components to make the omniphobic composition. In most cases, isocyanate groups are added in a slight molar excess. Final molar ratios of (i) isocyanate groups to (ii) hydroxy groups and amine-functional groups combined are typically between 1:1 to 1.6:1, for example at least 1:1, 1.1:1, or 1.2:1 and/or up to 1.4:1, 1.5:1, or 1.6:1.

In an embodiment, the thermoset polymer crosslinked backbone can include further types of backbone segments. For example, the backbone can include fourth backbone segments which have a structure corresponding to at least one of a urethane reaction product and a urea reaction product of at least one monoisocyanate (e.g., when a monoisocyanate is included with the polyisocyanate and the other reaction components forming the omniphobic composition). The monoisocyanate can be a reactive monomer with only one isocyanate reactive group, which can be used as a means to control crosslinking degree as well as to incorporate hydrophobic or other functional groups at an external or boundary portion of the thermoset polymer. Examples of monoisocyanates include R—(N=C=O), where R can include aromatic, alicyclic, and/or aliphatic groups, for example having at least 2, 4, 6, 8, 10 or 12 and/or up to 8, 12, 16, or 20 carbon atoms. The fourth backbone segments can be present in an amount ranging from 0.01 wt. % to 4 wt. % relative to the thermoset polymer (e.g., at least 0.01, 0.1, 0.2, or 0.5 wt. % and/or up to 1, 2, or 4 wt. %), which amounts can equivalently correspond to the monoisocyanate monomer, for example as added to a reaction mixture and relative to all monomeric, oligomeric, and polymeric reaction components added thereto.

In an embodiment, the omniphobic composition can include any suitable organic or inorganic filler or additive, which can be included to improve one or more of mechanical properties, optical properties, electrical properties, and omniphobic properties of the final composition. Examples of suitable fillers or additives include nanoclay, graphene oxide, graphene, silicon dioxide (silica), aluminum oxide, diatomaceous earth, cellulose nanocrystals, carbon nanotubes, titanium dioxide (titania), and combinations or mixtures thereof. In addition, the fillers can include biocides, pigments, dyes, a thermoplastic material, or a combination thereof. The fillers can be added in the range from 0.01 wt. % to 10 wt. %, for example in range from 1 wt. % to 5 wt. %. The presence of organic or inorganic fillers in the omniphobic composition can affect the clarity of the resulting composition, in which case the amount and size of the fillers can be selected in view of the desired clarity properties of the composition as well as the mechanical, electrical, omniphobic or other functional properties of the final composition.

The omniphobic properties of the thermoset composition (e.g., for the cured composition) can be characterized in terms of one or more contact angles and/or sliding angles for water and/or oil droplets (e.g., vegetable oil and/or hexadecane) on the thermoset composition (e.g., as a coating on a substrate). The following ranges are representative of compositions according to the disclosure which display favorable omniphobic properties. In an embodiment, the composition has a water contact angle in a range from 90° to 120° (e.g., at least 90°, 95°, 100°, or 105° and/or up to 110°, 115°, or 120°; such as for the cured composition as a coating). In some cases, the water contact angle can be up to about 125° for non-smooth or rough surfaces. In an embodiment, the composition has an oil contact angle in a range from 0° or 1° to 65° (e.g., at least 1°, 10°, 20°, or 30° and/or up to 40°, 50°, 60°, or 65°; such as for the cured composition as a coating). In an embodiment, the composition has a water sliding angle in a range from 0° or 1° to 30° for a 75 µl droplet (e.g., at least 1°, 2°, 4°, 6°, or 8° and/or up to 10°, 15°, 20°, or 30°; such as for the cured composition as a coating). In an embodiment, the composition has an oil sliding angle in a range from 0° or 1° to 20° for a 10 µl or 25 µl droplet (e.g., at least 1°, 2°, 4°, 6°, or 8° and/or up to 10°, 12°, 15°, or 20°; such as for the cured composition as a coating). The contact angles for the omniphobic coatings can be higher when nanofillers (e.g., clay, silica, etc.) are included in the composition as compared to corresponding compositions without any nanofillers.

Figure 4:
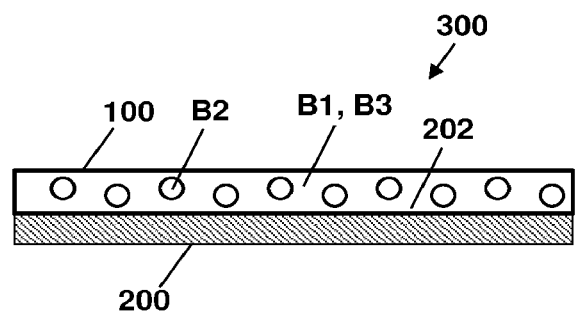
FIG. 4 illustrates a coated article according to the disclosure in which the thermoset omniphobic composition has a composite structure.

In an embodiment, the thermoset omniphobic composition has a composite structure as illustrated in FIG. 4. The composite structure can include a solid matrix formed primarily from the first backbone segments and the third backbone segments linked together (e.g., with or without some second backbone segments incorporated therein). The composite structure can further include nanodomains distributed throughout the solid matrix. The nanodomains are formed primarily from the second backbone segments (e.g., with or without minor amounts of first and/or third backbone segments incorporated therein), and generally have a size of 80 nm or less, more preferably 40 nm or less. The nanodomains can be liquid nanodomains or rubbery nanodomains, depending on the usage temperature of the omniphobic composition relative to the glass transition and melting temperatures of the amine-functional hydrophobic polymer precursor to the second backbone segments. For example, the nanodomains can have a size or diameter of at least 0.1, 1, 10, 15 or 20 nm and/or up to 30, 40, 50, or 80 nm; for example 1 nm to 40 nm or 1 nm to 80 nm. The ranges can represent a distribution of sizes for the nanodomains and/or a range for an average nanodomain size (e.g., weight-, number-, or volume-average size). In a lower limit as the size of the nanodomains approaches zero, the composition approaches a homogeneous structure as a homogeneous thermoset solid with the first, second, and third backbone segments being generally evenly distributed throughout the omniphobic composition as illustrated in FIG. 5.

Coated Article

Figure 5:
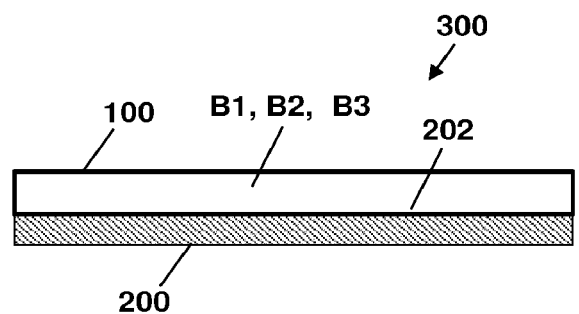
FIG. 5 illustrates a coated article according to the disclosure in which the thermoset omniphobic composition has a homogeneous structure.

FIGS. 4 and 5 illustrate an aspect of the disclosure in which a coated article 300 (e.g., desirably having omniphobic properties on at least one surface thereof) includes a substrate 200 and the thermoset omniphobic composition 100 coated on a surface 202 of the substrate 200. The composition 100 can be in the form of a coating or film on an external, environment-facing surface 202 of the substrate 200 (e.g., where the surface 202 would otherwise be exposed to the external environment in the absence of the composition 100). In this case, the thermoset omniphobic composition 100 provides omniphobic protection to the underlying substrate 200.

The substrate 200 is not particularly limited, and generally can be formed from any material desired for protection with an omniphobic coating, in particular given the good, broad adhesive capabilities of the thermoset omniphobic composition 100. For example, the substrate can be a metal, plastic, a different thermoset material (e.g., a primer material; material other than the other than thermoset omniphobic composition), glass, wood, fabric (or textile), or ceramic material. Examples of specific metals include steel, aluminum, copper, etc. Examples of specific plastics include polyvinyl alcohol (PVOH), ethylene vinyl alcohol (EVOH), polyethylene terephthalate (PET), polypropylene (PP), polyethylene (PE), polylactic acid (PLA), starch, chitosan, etc. In an embodiment, the substrate can be in the form of a three-dimensionally printed substrate, whether formed from a polymeric/plastic material or otherwise. Suitable wood materials can be any type of wood commonly used in home, office, and outdoor settings. Suitable glass materials can be those used for building windows, automobile windows, etc. In some embodiments, the substrate 200 is a top layer of a coating or series of coatings on a different underlying substrate. For example, the coated article can include a substrate 200 material as generally disclosed herein, one or more intermediate coatings on the substrate 200 (e.g., an epoxy coating, an acrylic coating, another primer coating, etc.), and the thermoset omniphobic composition 100 on the one or more intermediate coatings as the final, external coating on the coated article 300.

The thermoset omniphobic composition 100 can have any desired thickness on the substrate 200. In common applications, the composition 100 has a thickness ranging from 0.010 µm to 500 µm, for example at least 0.01, 10, 20, 50, or 100 µm and/or up to 200, 500 µm. Typical cast coatings can have thicknesses of 10 µm to 100 µm. Typical spin coatings can have thicknesses of 0.05 µm or 0.10 µm to 0.20 µm or 0.50 µm. Multiple coating layers can be applied to substrate 200 to form even thicker layers of the composition 100 (e.g., above 500 µm or otherwise) if desired.

Method of Making Composition and Coated Article

The thermoset omniphobic composition according to the disclosure generally can be formed by first reacting the polyisocyanate(s), the amine-functional hydrophobic polymer(s), and the polyol(s) to form a partially crosslinked (e.g., not fully crosslinked) reaction product, and then curing the partially crosslinked reaction product to form the thermoset omniphobic composition (e.g., after application a substrate to provide an omniphobic coating thereon). The partially crosslinked reaction product contains at least some unreacted isocyanate, hydroxy, and/or amine groups for eventual further reaction during curing/full crosslinking. In some embodiments, the partially crosslinked reaction product contain at least some unreacted isocyanate and hydroxy groups, but is free or substantially free of unreacted amine groups (e.g., where all or substantially all of the amine groups in the amine-functional hydrophobic polymer have reacted with an isocyanate group, but the polyisocyanates still have at least some free some unreacted isocyanate groups remaining). The initial, partial crosslinking reaction can be performed in a suitable reaction solvent or medium, for example an aprotic organic solvent such as acetone, tetrahydrofuran, 2-butanone, other ketones (e.g., methyl n-propyl ketone, methyl isobutyl ketone, methyl ethyl ketone, ethyl n-amyl ketone), esters (e.g., $C_1$-$C_4$ alkyl esters of $C_1$-$C_4$ carboxylic acids, such as methyl, ethyl, n-propyl, butyl esters of acetic acid such as n-butyl acetate, etc., n-butyl propionate, ethyl 3-ethoxy propionate), dimethylformamide, dimethyl carbonate, etc. In some cases, a mixture of two or more solvents can be used for the initial, partial crosslinking reaction. In some embodiments, a reaction catalyst is added to catalyze the reaction between the polyisocyanate and the polyol. Various commercial and laboratory-synthesized catalysts can be used, for example including, but not limited to, complexes and/or salts of tin (e.g., tin(II) 2-ethylhexanoate) or iron, and tertiary amines (e.g., triethylamine), 1,8-Diazabicyclo[5.4.0]undec-7-ene (DBU) and 1,4-Diazabicyclo[2.2.2]octane (DABCO). Curing can be performed by heating (e.g., in an oven, with exposure to a heat lamp, etc.) at a temperature from 80° C. or 100° C. to 140° C. or 180° C. and/or for a time from 1 hr to 24 hr. Lower heating temperature or ambient temperature curing also possible, such as room temperature curing (e.g., 20° C. to 30° C.) for 4 hr-240 hr or 5-10 days (e.g., at least 4, 8, 12, 16, or 24 hr and/or up to 12, 16, 24, 48, 72, 96, 120, or 240 hr), lower heating (e.g., 30° C. or 40° C. to 60° C. for 4 hr-96 hr or 2-4 days or 60° C. to 80° C. for 1 hr-72 hr or 1-3 days).

Reaction to form the partially crosslinked reaction product generally can be performed at any suitable reaction temperature(s) and time(s), which can be selected such that there is sufficient time to partially (but not completely) crosslink/cure the components of the reaction mixture, thus leaving some reactive functional groups for eventual full curing/crosslinking in the final thermoset composition. In an embodiment, reaction to form the partially crosslinked reaction product is performed (i) at temperature from 20° C. or 40° C. to 80° C. or 100° C. and (ii) for a time from 5 min to 300 min. Thus, reaction can be performed with or without heating the reaction mixture. Room-temperature (e.g., 20° C. to 30° C.) reactions are possible with longer reaction times and/or the addition of a catalyst. The initial reaction between the polyisocyanate and the hydrophobic polymer is generally very fast and need not be heated for suitable reaction times. Subsequent reaction between the polyisocyanate and the polyol is slower and preferably involves heating and/or the use of a catalyst.

In an embodiment, reaction to form the partially crosslinked reaction product includes stirring or otherwise mixing the reaction components to improve reactant homogeneity and that of the eventual product. Mixing or stirring during the reaction between the polyisocyanate and the hydrophobic polymer (e.g., whether the two are reacted/combined separately from or together with the polyol) is particularly desirable because the isocyanate/amine reaction is generally very fast, and mixing of the reaction mixture is desirable to help form a distributed partially cured reaction product in which most polyisocyanate molecules have at least one free isocyanate functional group for eventual reaction with a polyol molecule. Put another way, stirring/mixing helps to avoid a situation in which some polyisocyanate molecules have all of their isocyanate groups reacted with amine groups from the amine-functional hydrophobic polymer, which in turn prevents further reaction with a polyol molecule for incorporation into the crosslinked network of the thermoset polymer and can lead to opaque or hazy films (i.e., instead of desirably transparent films). Accordingly, mixing/stirring combined with appropriate selection of stoichiometric ratios between the polyisocyanate, the amine-functional hydrophobic polymer, and the polyol helps to ensure that most, if not all or substantially all, polyisocyanate molecules react with at least one polyol molecule (e.g., having at least one urethane link).

In an embodiment, reaction to form the partially crosslinked reaction product includes first reacting the polyisocyanate and the amine-functional hydrophobic polymer (e.g., in the absence of the polyol) to form an initial reaction product. Reaction to form the initial reaction product is preferably performed with mixing or stirring as above to obtain a good distribution of unreacted polyisocyanate molecules and/or partially amine-reacted polyisocyanate molecules with at least one isocyanate group available for further reaction. The initial reaction product suitably contains amine-reacted polyisocyanate molecules as well as possibly one or both of unreacted polyisocyanate molecules and unreacted amine-functional hydrophobic polymers. This step can be performed in a single reaction vessel prior to addition of the at least one polyol, and is preferably performed in the absence of any reactive hydroxyl-containing species, whether polyol or otherwise. The initial reaction product is then reacted with the polyol to form partially crosslinked reaction product, for example by adding or otherwise combining the polyol with the initial reaction product between the polyisocyanate and the amine-functional hydrophobic polymer (e.g., in the same reaction vessel, and optionally with heating and/or further catalyst addition). This sequence of addition/reaction is preferable but required. Other sequences of addition or combination of all three reactive components at the same time are possible. In some cases, the resulting thermoset omniphobic composition might have relatively poorer optical properties in terms of being partially opaque or not completely transparent, but the composition generally has the same or comparable omniphobic properties with respect to contact and gliding angles, etc.

In an embodiment, curing the partially crosslinked reaction product includes adding a casting solvent to the partially crosslinked reaction product. Suitably, the casting solvent is one that does not dissolve the amine-functional hydrophobic polymer, which is a suitable selection whether the final thermoset composition is desired to have an inhomogeneous composite-type structure with nanodomains as described above or a homogeneous structure Examples of suitable casting solvents include dimethyl carbonate, diethyl carbonate, dimethylformamide, dimethylacetamide, acetonitrile, etc. Further, it can be desirable to remove the reaction solvent used for form partially crosslinked reaction product, for example by heating and/or using a gas such as nitrogen (e.g., purging or bubbling the gas through the reaction mixture), so that the partially crosslinked reaction product is in solution in the casting solvent. The casting solvent and the partially crosslinked reaction product are then applied to a substrate, which is subsequently air-dried to remove the casting solvent and form a coating of the partially crosslinked reaction product on the substrate. The dried coating is then cured as described above to form the thermoset omniphobic composition coating on the substrate. In most cases, the cured thermoset remains as a coating on the substrate to provide omniphobic properties to the substrate. In some embodiments, the cured thermoset can be deliberately peeled or otherwise removed from the substrate to provide a standalone composition in the form or a free film or other coating. The coating can be applied using any suitable method, such as by casting, spraying, rolling and/or dipping.

In an embodiment, curing the partially crosslinked reaction product includes applying the partially crosslinked reaction product to a substrate (e.g., applied as dissolved/dispersed in its original reaction medium or reaction solvent, without solvent exchange/addition with a casting solvent). The coated substrate is then dried (e.g., to remove the reaction solvent) to form a coating of the partially crosslinked reaction product on the substrate. The dried coating is then cured as described above to form the thermoset omniphobic composition coating on the substrate.

EXAMPLES

The following examples illustrate the disclosed compositions and methods, but are not intended to limit the scope of any claims thereto. In the following examples, thermoset omniphobic compositions generally according to the disclosure are prepared and applied as a film or coating on a test substrate such as glass. The applied films or coatings can then be evaluated according to a variety of tests as described below in order to characterized their relative degree of omniphobicity.

Figure 1:
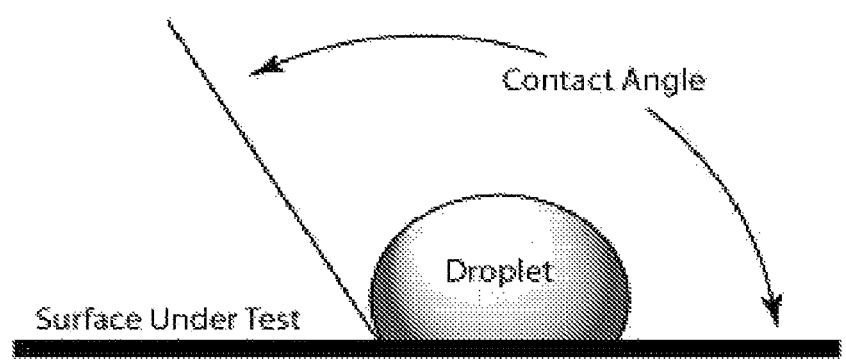
FIG. 1 is a diagram illustrating measurement of a contact angle for a liquid droplet on a surface.
Figure 2:
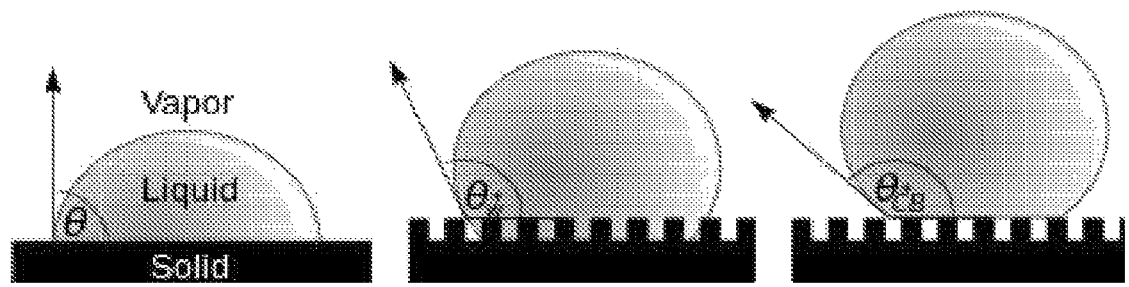
FIG. 2 is a diagram illustrating how contact angles for a given liquid droplet on a surface can vary as a function of surface topology (e.g., flat or smooth surface vs. textured surfaces).

Contact Angle: Contact angles (see FIG. 1) are determined by applying a liquid droplet on a test coating surface that is stationary and horizontal with respect to gravity. Any specified liquids can be used, but omniphobic coatings are generally characterized by determining contact angles for water droplets and separately for oil droplets (e.g., a cooking or other common vegetable oil, hexadecane or other oily liquid hydrocarbon). The applied droplets have a volume of about 5 µl (e.g., about 3 µl to 10 µl), although the measured contact angle is not particularly sensitive to actual droplet volume in these ranges. Once applied to the test coating, the droplet can be visually interrogated through any suitable means to determine the contact angle (e.g., using conventional digital image photography and digital image analysis). Suitably, (cured) omniphobic composition coatings according to the disclosure have a water contact angle in a range from 90° to 120° (e.g., at least 90°, 95°, 100°, or 105° and/or up to 110°, 115°, or 120°). Suitably, (cured) omniphobic composition coatings according to the disclosure have an oil contact angle in a range from 0° or 1° to 65° (e.g., at least 1°, 10°, 20°, or 30° and/or up to 40°, 50°, 60°, or 65°).

Sliding Angle: Sliding angles are determined by applying a liquid droplet on a test coating surface that is initially horizontal with respect to gravity. The test coating surface is then gradually ramped at a controlled/known angle relative to the horizontal plane. Droplets which do not initially spread will remain stationary on the test surface until the test surface is ramped to a sufficiently high angle to cause the droplets to slide down the ramped test surface. The test surface angle at which sliding begins is the sliding angle of the test coating. Any specified liquids can be used, but omniphobic coatings are generally characterized by determining contact angles for water droplets and separately for oil droplets (e.g., a cooking or other common vegetable oil, hexadecane or other oily liquid hydrocarbon). The applied droplets have a specified volume, which is generally about 75 µl (e.g., about 50 µl to 150 µl) for water and about 10 µl or 20 µl (e.g., about 5 µl to 40 µl) for oil. Once applied to the test coating, the droplet can be visually interrogated through any suitable means to determine the sliding angle (e.g., using conventional digital image photography and digital image analysis). Suitably, (cured) omniphobic composition coatings according to the disclosure have a water sliding angle in a range from 0° or 1° to 30° (e.g., at least 1°, 2°, 4°, 6°, or 8° and/or up to 10°, 15°, 20°, or 30°). Suitably, (cured) omniphobic composition coatings according to the disclosure have an oil contact angle in a range from 0° or 1° to 20° (e.g., at least 1°, 2°, 4°, 6°, or 8° and/or up to 10°, 12°, 15°, or 20°).

Scratch Resistance: Scratch resistance is evaluated on a scale of 1 (worst) to 10 (best) by attempting to scratch a test coating surface using materials of various hardness, such as a human fingernail, the corner/edge of a glass slide, a metal (e.g., stainless steel) knife, etc. The test surface is rated as "1" for a given scratching material if there is substantial damage or delamination of the test coating surface after being scratched. The test surface is rated as "10" for a given scratching material if there is no observable damage or marking on the test coating surface after being scratched. These qualitative numbers were obtained based on the criteria including: 1) the depth of the scratch, 2) is scratch damaging the surface, and 3) whether the scratch be felt if touched by hand.

Permanent Ink Resistance: Permanent ink resistance is evaluated on a scale of 1 (worst) to 10 (best) by applying an ink marking on a test coating surface using a permanent ink marker (e.g., SHARPIE permanent ink marker or equivalent) and then attempting to wipe off the marking using a tissue (e.g., KIMWIPE laboratory cleaning tissue or equivalent). The test surface is rated as "1" if all of the ink marking remains on the test coating surface after being wiped. The test surface is rated as "10" if all of the ink marking is removed from the test coating surface after being wiped. These numbers give an estimation of the ink-resistance, which are qualitatively assigned by taking two aspects in consideration: 1) the amount of ink left behind after a single wipe of the sample, and 2) the ink left behind after multiple wipes of the sample.

Example 1—One-Pot Synthesis of Omniphobic Polyurethane 2.2 ml (2.3 g) of poly(hexamethylene diisocyanate) (DESMODUR N 100A; Bayer Chemical Company, primarily including (trifunctional) triisocyanate species) was taken in a 20 ml vial, and was diluted with 2.0 mL tetrahydrofuran (THF). To this solution, 0.05 ml (0.049 g) bis-(3-aminopropyl)-terminated polydimethylsiloxane (denoted as $NH_2$—PDMS-$NH_2$ or PDMS-diamine; ($M_n$=2500 g/mol); Sigma-Aldrich) was diluted with 0.2 ml THF and was added slowly under stirring. Subsequently, 0.68 ml (0.69 g) of polyether polyol (MULTRANOL 4011; ~306 MW g/mol triol; Bayer Chemical Company) was added to the 20 ml vial. The vial was then heated and stirred at 60° C. for 20 minutes. The vial was cooled to room temperature and then 6 ml dimethyl carbonate (DMC) was added to the vial. THF from the solution was removed by bubbling of nitrogen gas (or under reduced pressure). After complete removal of THF, the remaining coating solution in DMC was cast on a 3 inch×1 inch micro glass slide by placing them on a leveled surface. The cast film was air dried for 30 minutes before curing a coating in oven at 100° C. for 6 hours.

The cast film was tested to characterized its relative degree of omniphobicity, and it had the following properties: Water Contact Angle: 102°; Water Sliding Angle: 25° (75 µL droplet); Oil Contact Angle: 55° (Cooking/vegetable oil); Oil Sliding Angle: 15° (5 µL droplet); Permanent Ink Resistance: 10 (in a scale of 1-10, where 10 is the best and 1 is the worst) [Appearance: clear transparent; and Scratch Resistance: 10 (in a scale of 1-10, where 10 is excellent).

This example illustrates a one-pot approach according to the disclosure for making an omniphobic coating with several favorable properties such as scratch resistance, permanent ink resistance, good optical clarity, and an anti-graffiti surface. In contrast to Hu et al. U.S. Publication No. 2016/0200937 which uses a two-step/two-pot approach in which a polysiloxane (or other hydrophobic component) is first grafted onto a copolymer with randomly distributed hydrophobic functional groups using toxic chemicals such as oxalyol chloride and phosgene gas, prior chemical modification of the monomer units is not required in the present process, thus providing a structurally distinct polymer product that can be formed in a one-pot process that also avoids the use and separation of the toxic grafting chemical reagents.

Example 2—Synthesis of Omniphobic Polyurethanes with Variable Polvol, Polvisocyanate Components The following examples illustrate omniphobic coatings according to the disclosure using a variety of different polyol and polyisocyanate components.

Example 2.1: 20 mg HDI trimer biuret (UH 80; available from Sherwin-Williams) was taken in 20 mL vial and diluted with 2 mL acetone. To this solution, 2.5 mg PDMS-Diamine (dissolved in acetone) was added drop-wise, and the mixture was stirred for 5 minutes. Then to this solution, 58 mg acrylic polyol (C939; available from Sherwin-Williams) was added, and the mixture was stirred at 65° C. for 2 hrs. This solution was cooled and diluted with 2 mL DMC. Using $N_2$ bubbling, acetone was removed and remaining solution was drop casted on a test substrate glass and cured at 120° C. in oven for 6 hrs.

Example 2.2: A coating was formed as in Example 2.1, except that 22 mg UH 80 polyisocyanate and 5 mg PDMS-Diamine were used.

Example 2.3: A coating was formed as in Example 2.1, except that 80 mg UH 80 polyisocyanate and 25 mg PDMS-Diamine were used.

Example 2.4: 50 mg HDIT (DESMODUR N 100A, trifunctional HDI trimer with a trifunctional HDI biuret was taken in 20 mL vial and diluted with 3 mL acetone. To this solution, 2.5 mg octyl isocyanate (dissolved in acetone) was added followed by dropwise addition of 5 mg PDMS-Diamine (dissolved in acetone), and the mixture was stirred for 5 minutes. Then to this solution 240 mg polyol (C939) was added, and the mixture was stirred at 65° C. for 2 hrs. This solution was cooled and diluted with 6 mL DMC. Using $N_2$ bubbling, acetone was removed and remaining solution was drop casted on a test substrate glass and cured at 120° C. in oven for 6 hrs. A coating Sample "A" was prepared in which the final solution (1 mL) was diluted in 1 mL DMC and drop casted and cured at 120° C. for 6 hrs. A coating Sample "B" was prepared in which the final solution (1 mL) was diluted in 2 mL DMC and drop casted and cured at 120° C. for 6 hrs.

Example 2.5: A coating was formed as in Example 2.4, except that 5 mg octyl isocyanate was used, and an additional coating Sample "C" was prepared in which the final solution (1 mL) was diluted in 3 mL DMC and drop casted and cured at 120° C. for 6 hrs.

Example 2.6: A coating was formed as in Example 2.4, except that 10 mg octyl isocyanate was used.

Results: The films according to Examples 2.1-2.3 were very transparent with a very thin film, having a 4-drop (~80 µL) water sliding angle of about 20° and 1-drop oil (~5 µL) sliding angle of about 20°. The films according to Examples 2.4-2.6 were not that much transparent, but they showed good omniphobic properties as compared to Examples 2.1-2.3. Example 2.5 had a 4-drop (~80 µL) water sliding angle of about 20°-25° and 1-drop oil (~5 µL) sliding angle of about 20°-25°. The other samples [examples 2.1-2.4] had a larger drop volume comparable water and oil sliding angles of about 20°-25°. Example 2.4 showed good repellency as compare to other samples with fast sliding at ~20°-25° with 1 drop (5 µL) of oil.

Example 3—Synthesis of Omniphobic
Polyurethanes with Variable PDMS Components

The following examples illustrate omniphobic coatings according to the disclosure using a mono-functional amine PDMS component additionally containing an alkyl (octyl) tail.

Example 3.1: 2.2 mL (2.3 g) HDIT (DESMODUR N 100A) was taken in 20 mL vial and diluted with 2 mL THF. To this solution, 0.05 mL (~0.05 g) octyl-PDMS-NH$_2$ ([PDMS type, Mn=2655, prepared by reacting NH$_2$—PDMS-NH$_2$ (Mn=2500 g/mol) with isooctyl isocyanate) was added dropwise, and the mixture was stirred for 5 minutes. Then to this solution, 0.68 mL (0.69 g) polyether polyol (MULTRANOL 4011) was added, and the mixture was stirred at 60° C. for 20 min. This solution was cooled and diluted with 6 mL DMC. Using N$_2$ bubbling, THF was removed and the remaining solution was drop casted on a test substrate glass and cured at 120° C. in oven for 6 hrs.

Example 3.2: A coating was formed as in Example 3.1, except that 2.3 mL (2.4 g) HDIT polyisocyanate and 0.02 mL (~0.02 g) octyl-PDMS-NH$_2$ were used.

Example 3.3: A coating was formed as in Example 3.1, except that 2.4 mL (2.5 g) HDIT polyisocyanate and 0.1 mL (0.1 g) octyl-PDMS-NH$_2$ were used.

Example 3.4: A coating was formed as in Example 3.1, except that 1.10 mL (1.15 g)HDIT polyisocyanate in acetone (i.e., instead of THF) and 50 mg octyl-PDMS-NH$_2$ in acetone were used. Further, a coating Sample "A" was prepared in which the final solution (1 mL) was diluted in 1 mL DMC and drop casted and cured at 120° C. for 6 hrs, a coating Sample "B" was prepared in which the final solution (1 mL) was diluted in 2 mL DMC and drop casted and cured at 120° C. for 6 hrs, and a coating Sample "C" was prepared in which the final solution (1 mL) was diluted in 3 mL DMC and drop casted and cured at 120° C. for 6 hrs.

Example 3.5: A coating was formed as in Example 3.4, 2.3 mL (2.6 g) HDIT polyisocyanate in acetone, 100 mg octyl-PDMS-NH$_2$ in acetone, and 1.4 mL (1.4 g) MULTRANOL 4011 polyol were used.

Results: The sample coatings were transparent, showing slightly milky appearance at aggregated coatings areas. Example 3.1 show omniphobic properties with a 6-7 drop (120-140 µL) water sliding angle of about 30°-35° and a 2-3 drop (10-15 µL) oil sliding angle of about 30°-35°. Other samples showed 10-12 drops (200-220 µL) water sliding angles of about 30°-35°, while oil repellency was about the same with a 2-3 drop (15-20 µL) oil sliding angle of about 30°-35°.

Example 4—Synthesis of Omniphobic
Polyurethanes with Variable PDMS Components

The following examples illustrate omniphobic coatings according to the disclosure using a mono-functional amine PDMS component with no further functionalization (e.g., no alkyl (octyl) tail as in Example 3).

Example 4.1: 1.1 mL (1.15 g) HDIT (DESMODUR N 100A) was taken in 20 mL vial and diluted with 2 mL acetone. To this solution, 1.2 mg PDMS-NH$_2$ dissolved in acetone (MW 1000 average, MONOAMINOPROPYL TERMINATED POLYDIMETHYLSILOXANE, asymmetric, 8-12 cst, GELEST) was added dropwise, and the mixture was stirred for 5 minutes. Then to this solution, 0.70 mL (0.71 g) polyether polyol (MULTRANOL 4011) was added, and the mixture was stirred at 60° C. for 1 hr. This solution was cooled and diluted with 6 mL DMC. Using N$_2$ bubbling, acetone was removed and the remaining solution was drop casted on a test substrate glass and cured at 120° C. in oven for 6 hrs.

Example 4.2: A coating was formed as in Example 4.1, except that 1.15 mL (1.20 g) HDIT polyisocyanate and 6 mg PDMS-NH$_2$ were used.

Example 4.3: A coating was formed as in Example 4.1, except that 1.15 mL (1.20 g) HDIT polyisocyanate and 12 mg PDMS-NH$_2$ were used.

Example 4.4: A coating was formed as in Example 4.1, except that 1.25 mL (1.30 g) HDIT polyisocyanate and 24 mg PDMS-NH$_2$ were used.

Example 4.5: A coating was formed as in Example 4.1, except that 1.45 mL (1.51 g) HDIT polyisocyanate and 48 mg PDMS-NH$_2$ were used.

Example 5—Synthesis of Omniphobic
Polyurethanes with Variable PDMS Components

The following examples illustrate omniphobic coatings according to the disclosure using a mono-functional amine PDMS component with no further functionalization, similar to Example 4 but with a higher molecular weight PDMS component.

Example 5.1: 1.1 mL (1.15 g) HDIT (DESMODUR N 100A) was taken in 20 mL vial and diluted with 2 mL acetone. To this solution, 2 mg PDMS-NH$_2$ dissolved in acetone (MW 2000 average) (MONOAMINOPROPYL TERMINATED POLYDIMETHYLSILOXANE, asymmetric, 18-25 cSt, GELEST) was added dropwise, and the mixture was stirred for 5 minutes. Then to this solution, 0.7 mL (0.71 g) polyether polyol (MULTRANOL 4011) was added, and the mixture was stirred at 60° C. for 1 hr. This solution was cooled and diluted with 6 mL DMC. Using $N_2$ bubbling, acetone was removed and the remaining solution was drop casted on a test substrate glass and cured at 120° C. in oven for 6 hrs.

Example 5.2: A coating was formed as in Example 5.1, except that 1.15 mL (1.20 g) HDIT polyisocyanate and 10 mg PDMS-$NH_2$ were used.

Example 5.3: A coating was formed as in Example 5.1, except that 1.15 mL (1.20 g) HDIT polyisocyanate and 20 mg PDMS-$NH_2$ were used.

Example 5.4: A coating was formed as in Example 5.1, except that 1.25 mL (1.30 g) HDIT polyisocyanate and 40 mg PDMS-$NH_2$ were used.

Example 5.5: A coating was formed as in Example 5.1, except that 1.45 mL (1.51 g) HDIT polyisocyanate and 80 mg PDMS-$NH_2$ were used.

Example 6—Synthesis of Omniphobic Polyurethanes with PDMS Component Blends

The following examples illustrate omniphobic coatings according to the disclosure using a blend of mono-functional amine PDMS components with no further functionalization at different ratios.

Example 6.1: 1.1 mL (1.15 g) HDIT (DESMODUR N 100A) was taken in 20 mL vial and diluted with 1 mL acetone and vortexed for less than 1 minute. To this solution, 1.2 mg PDMS-$NH_2$ (1K) dissolved in acetone (MW 1000 average) followed by 2 mg PDMS-$NH_2$ (2K) dissolved in acetone (MW 2000 average) were added dropwise, and the mixture was stirred for 5 minutes. Then to this solution, 0.7 mL (0.71 g) polyether polyol (MULTRANOL 4011) was added, and the mixture was stirred at 60° C. for 1 hr. This solution was cooled and diluted with 6 mL DMC. Using $N_2$ bubbling, acetone was removed and the remaining solution was drop casted on a test substrate glass and cured at 120° C. in oven for 6 hrs.

Example 6.2: A coating was formed as in Example 6.1, except that 6 mg PDMS-$NH_2$ (1K) was used.

Example 6.3: A coating was formed as in Example 6.1, except that 1.2 mL (1.25 g) HDIT polyisocyanate and 12 mg PDMS-$NH_2$ (1K) were used.

Example 6.4: A coating was formed as in Example 6.1, except that 1.2 mL (1.25 g) HDIT polyisocyanate and 24 mg PDMS-$NH_2$ (1K) were used.

Example 6.5: A coating was formed as in Example 6.1, except that 1.25 mL (1.03 g) HDIT polyisocyanate and 48 mg PDMS-$NH_2$ (1K) were used.

Example 6.6: A coating was formed as in Example 6.1, except that 1.2 mL (1.25 g) HDIT polyisocyanate and 80 mg PDMS-$NH_2$ (1K) were used.

Example 6.7: A coating was formed as in Example 6.1, except that the PDMS-$NH_2$ (2K) component was added before the PDMS-$NH_2$ (1K) component.

Example 6.8: A coating was formed as in Example 6.7, except that 10 mg PDMS-$NH_2$ (2K) was used.

Example 6.9: A coating was formed as in Example 6.7, except that 1.2 mL (1.25 g) HDIT polyisocyanate and 20 mg PDMS-$NH_2$ (2K) were used.

Example 6.10: A coating was formed as in Example 6.7, except that 1.2 mL (1.25 g) HDIT polyisocyanate and 40 mg PDMS-$NH_2$ (2K) were used.

Example 6.11: A coating was formed as in Example 6.7, except that 1.25 mL (1.30 g) HDIT polyisocyanate and 80 mg PDMS-$NH_2$ (2K) were used.

Example 7—Synthesis of Omniphobic Polyurethanes with PDMS Component Blends

The following examples illustrate omniphobic coatings according to the disclosure using a blend of mono-functional amine PDMS components with no further functionalization at different PDMS concentrations.

Example 7.1: 1.1 mL (1.15 g) HDIT (DESMODUR N 100A) was taken in 20 mL vial and diluted with 1 mL acetone and vortexed for less than 1 minute. To this solution, 10 mg PDMS-$NH_2$ (2K) dissolved in acetone (MW 2000 average) followed by 6 mg PDMS-$NH_2$ (1K) dissolved in acetone (MW 1000 average) were added dropwise, and the mixture was stirred for 5 minutes. Then to this solution, 0.7 mL (0.71 g) polyether polyol (MULTRANOL 4011) was added, and the mixture was stirred at 60° C. for 1 hr. This solution was cooled and diluted with 6 mL DMC. Using $N_2$ bubbling, acetone was removed and the remaining solution was drop casted on a test substrate glass and cured at 120° C. in oven for 6 hrs.

Example 7.2: A coating was formed as in Example 7.1, except that 20 mg PDMS-$NH_2$ (2K) and 12 mg PDMS-$NH_2$ (1K) were used.

Example 7.3: A coating was formed as in Example 7.1, except that 1.25 mL (1.3 g) HDIT polyisocyanate, 20 mg PDMS-$NH_2$ (2K), and 12 mg PDMS-$NH_2$ (1K) were used.

Results: Samples showed sliding angles of about 15°-20° for water as well as oil (75 μL and 15 μL droplets, respectively). Example 7.1 was best among these three for both water and oil.

Example 8—Synthesis of Omniphobic Polyurethanes with PDMS Component Blends at Various Curing Conditions The following examples illustrate omniphobic coatings according to the disclosure using a blend of mono-functional amine PDMS components with no further functionalization at different ratios and curing conditions.

Example 8.1: 1.25 mL (1.30 g) HDIT (DESMODUR N 100A) was taken in 20 mL vial and diluted with 1 mL acetone and vortexed for less than 1 minute. To this solution, 20 mg PDMS-$NH_2$ (1K) (MW 1000 average) and 2 mg PDMS-$NH_2$ (2K) (MW 2000 average) both dissolved in acetone were added dropwise, and the mixture was stirred for 5 minutes. Then to this solution, 0.7 mL (0.71 g) polyether polyol (MULTRANOL 4011) was added followed by addition of tin(II) 2-ethylhexanoate catalyst (2 drops (12 mg)), and the mixture was stirred at 60° C. for 5 minutes. This solution was cooled and diluted with 6 mL DMC. Using $N_2$ bubbling, acetone was removed and the remaining solution was drop casted on a test substrate glass and cured at 120° C. in an oven.

Additional curing conditions were performed as follows. A coating Sample "A" was prepared as in Example 8.1, except that the coating was cured at room temperature. A coating Sample "B" was prepared as in Example 8.1, except that the coating was cured at 50° C. A coating Sample "C" was prepared as in Example 8.1, except that the coating was cured at 70° C. A coating Sample "D" was prepared as in Example 8.1, except that the final solution (1 mL) was diluted in 1 mL DMC and drop casted and cured at 120° C. for 6 hrs. A coating Sample "E" was prepared as in Example 8.1, except that the final solution (1 mL) was diluted in 2 mL DMC and drop casted and cured at 120° C. for 6 hrs.

Example 8.2: A coating was formed as in Example 8.1 (including additional curing samples A-E), except that 1.45 mL (1.51 g) HDIT polyisocyanate, 48 mg PDMS-NH$_2$ (1K), and 80 mg PDMS-NH$_2$ (2K) were used.

Example 8.3: A coating was formed as in Example 8.1 (including additional curing samples A-E), except that 1.78 mL (1.78 g) HDIT polyisocyanate, 96 mg PDMS-NH$_2$ (1K), and 160 mg PDMS-NH$_2$ (2K) were used.

Example 8.4: A coating was formed as in Example 8.1 (including additional curing samples A-E), except that 1.7 mL (1.9 g) HDIT polyisocyanate, 96 mg PDMS-NH$_2$ (1K), and 80 mg PDMS-NH$_2$ (2K) were used.

Example 8.5: A coating was formed as in Example 8.1 (including additional curing samples A-E), except that 1.45 mL (1.51 g) HDIT polyisocyanate, 96 mg PDMS-NH$_2$ (1K), and 40 mg PDMS-NH$_2$ (2K) were used.

Example 8.6: A coating was formed as in Example 8.1 (including additional curing samples A-E), except that 1.25 mL (1.30 g) HDIT polyisocyanate, 6 mg PDMS-NH$_2$ (1K), and 40 mg PDMS-NH$_2$ (2K) were used.

Example 8.7: A coating was formed as in Example 8.1 (including additional curing samples A-E), except that 1.25 mL (1.30 g) HDIT polyisocyanate, 12 mg PDMS-NH$_2$ (1K), and 40 mg PDMS-NH$_2$ (2K) were used.

Example 8.8: A coating was formed as in Example 8.1 (including additional curing samples A-E), except that 1.3 mL (1.36 g) HDIT polyisocyanate, 12 mg PDMS-NH$_2$ (1K), and 80 mg PDMS-NH$_2$ (2K) were used.

Example 8.9: A coating was formed as in Example 8.1 (including additional curing samples A-D), except that 1.25 mL (1.30 g) HDIT polyisocyanate, 2 mg PDMS-NH$_2$ (1K), and 20 mg PDMS-NH$_2$ (2K) were used.

Results: Examples 8.3, 8.3C, 8.6, 8.6C, 8.8, and 8.8C showed 10° sliding angles for water (75 µL droplet) as well as oil (15 µL droplet), but oil droplets were slowly gliding on the surface. The "B" samples cured at 50° C. showed curing after 48 hrs, and showed 10°-15° sliding angles for water (75 µL droplet) as well as oil (15 µL droplet). Example 8.8B coatings were best amongst all for oil repellency showing high gliding ability as compared to other samples. All of the "A" samples cured at room temp showed 20°-30° sliding angles for water (75 µL droplet) and oil (15 µL droplet) repellency.

Example 9—Synthesis of Omniphobic Polyurethanes without Solvent Evaporation

The following examples illustrate omniphobic coatings according to the disclosure using a blend of mono-functional amine PDMS components with no further functionalization at different ratios and curing conditions.

Example 9.1: Polyol (MULTRANOL 4011, 0.7 mL (0.71 g) and HDIT (1.1 mL, 1.15 g) were dissolved in DMC (4 mL). The mixture heated at 70° C. for 1 h. Then the solution was cooled and 1.2 mg PDMS-NH$_2$ (1K) dissolved in 1 mL of DMC was added dropwise into it under stirring. For samples "A", "B", and "C", the solutions were stirred for 2 min, 4 min, and 10 min, respectively, and then drop casted on a glass slide. Once all DMC was evaporated, the coating was cured at 120° C. for 2.5 h. The samples exhibited average-good optical properties (heat treatment improved the optical properties), and good water and oil sliding angles.

Example 9.2: A coating was formed as in Example 9.1 (including samples A-C), except that 20 mg PDMS-NH$_2$ (2K) was used in place of PDMS-NH$_2$ (1K). The samples exhibited average optical properties, and good water and oil sliding angles.

Example 9.3: A coating was formed as in Example 9.1 (including samples A-C), except that the initial mixture was not heated at 70° C. for 1 h. The samples exhibited average-good optical properties, and good water and oil sliding angles.

Example 9.4: A coating was formed as in Example 9.3 (including samples A-C), except that 20 mg PDMS-NH$_2$ (1K) was used. The samples exhibited average-good optical properties, and good water and oil sliding angles.

Example 9.5: Polyol (MULTRANOL 4011, 0.7 mL (0.71 g) and HDIT (1.1 mL, 1.15 g) were dissolved in DMC (2 mL). The mixture heated at 70° C. for 1 h. For sample "A", the solution was cooled and 1.2 mg PDMS-NH$_2$ (1K) dissolved in 0.1 mL of acetone was added dropwise into it under stirring. For sample "B", the solution was cooled and 1.2 mg PDMS-NH$_2$ (1K) dissolved in 0.3 mL of acetone was added dropwise into it under stirring. The sample solutions were stirred for 2 min or 8 min, and then drop casted on a glass slide. Once all DMC was evaporated, the coating was cured at 120° C. for 2.5 h. The samples exhibited good optical properties, and good water and oil sliding angles.

Example 9.6: A coating was formed as in Example 9.5 (including samples A-B), except that the initial mixture was not heated at 70° C. for 1 h. The samples exhibited good optical properties, and good water and oil sliding angles.

Example 9.7: A coating was formed as in Example 9.5 (including samples A-B), except that the PDMS-NH$_2$ (1K) was dissolved in acetone instead of THF. The samples exhibited good optical properties, but bad water and oil sliding angles.

Example 9.8: A coating was formed as in Example 9.7 (including samples A-B), except that the initial mixture was not heated at 70° C. for 1 h. The samples exhibited good optical properties, but bad water and oil sliding angles.

Example 9.9: 1 mL (1.04 g) HDIT was added to 0.70 mL (0.71 g) polyol (MULTRANOL 4011) followed 1.5 mL acetone into it. Then this solution was vortexed for about 1 minute until dissolution. To this solution, 1 drop (6 mg) of tin(II) 2-ethylhexanoate was added and stirred for 20 min at room temperature. To this solution, 1.2 mg PDMS-NH$_2$ (1K) (dissolved in acetone) was added dropwise and stirred at room temp for 5 min. Then 6 mL DMC was added into the mixture. Using N$_2$ bubbling, acetone was removed and the remaining solution was drop casted on a test substrate glass and cured at 120° C. in an oven.

Additional curing conditions were performed as follows. A coating Sample "A" was prepared as in Example 9.9, except that the coating was cured at 70° C. A coating Sample "B" was prepared as in Example 9.9, except that the coating was cured at 50° C. A coating Sample "C" was prepared as in Example 9.9, except that the coating was cured at room temperature.

Example 9.10: A coating was formed as in Example 9.9 (including samples A-C), except that 2.0 mg PDMS-NH$_2$ (2K) was used instead of 1.2 mg PDMS-NH$_2$ (1K).

Results: The results for Examples 9.9 and 9.10 were generally same as between samples using PDMS-NH$_2$ (1K) or samples using PDMS-NH$_2$ (2K) for samples prepared at 70° C. The samples showed sliding angles of about 15°-20° with 4 drops of water (~80 µL) for Examples 9.9, 9.9A, 9.10 and 9.10A.

Example 10—Green. One-Pot Synthesis Omniphobic Polyurethanes Coatings

The following examples illustrate a green approach for making omniphobic, fluorine-free water-, oil- and ink-repellent polyurethane coatings. It is a green approach because of the following improvements over the above the method. 1) Solvent: Dimethyl carbonate (DMC) is used as a solvent. DMC is exempted under the definition of volatile organic compounds (VOCs) by the U.S. EPA 2009. Thus, DMC is particularly suitable for commercial coatings produced on a large scale. 2) Temperature: No prior heating is required for casting, thus saving time and energy. 3) Full curing of the coatings can be performed at 70-80° C. instead of 70-80 to 120° C. 4) No bubbling of VOCs (e.g., THE/acetone), for example in a solvent exchange process (i.e., which can be omitted with the green approach). The examples illustrate the synergy of suitable catalyst, aprotic polar solvents such as dimethyl carbonate, and the use of reactive groups on polydimethylsiloxane, which enable the formation of optically clear films with excellent water, oil and ink repellency. In the absence of proper catalyst, aprotic polar solvents, or reactive group on PDMS, the films are optically not very clear. The polyurethane coatings are readily applicable to metal, glass, wood, plastics and fabrics because of the strong adhesive properties of the polyurethanes. The obtained coatings are durable due to the crosslinked polyurethane matrix and are optically clear even for relatively thick coatings (e.g., over 100 microns, such as 100-500 microns). The coating compositions can be used in water-, oil-, anti-fingerprint and anti-graffiti paints.

Materials: Acetone (Fisher Thermo Scientific), Dimethyl carbonate (Sigma Aldrich), Bis-(3-aminopropyl)-terminated polydimethylsiloxane (PDMS-2.5K, Mn=2500 g/mol, Sigma-Aldrich), monoaminopropyl terminated polydimethylsiloxane-asymmetric (PDMS-1K, Mn=1000 g/mol, Gelest. INC), monoaminopropyl terminated polydimethylsiloxane-asymmetric (PDMS-2K, Mn=2000 g/mol, Gelest. INC) were purchased and used without further purification. 1,8-Diazabicyclo[5.4.0]undec-7-ene ("DBU"), 1,4-Diazabicyclo[2.2.2]octane (DABCO), Tin(II) 2-ethylhexanoate ("Tin II" or "Tin") were used as received. Polypropylene oxide-based triol (Mn=300 g/mol, MULTRANOL 4011, from Covestro) and poly(hexamethylene diisocyanate) (DESMODUR N 100A from Covestro), acrylic polyol (CC939, Sherwin-Williams) and hexamethylene diisocyanate trimer (HDIT, UH80, from Sherwin-Williams) were used as received. A reducer or solvent mixture (US38, Sherwin-William) is a mixture of n-butyl propionate, n-butyl acetate, ethyl n-amyl ketone, ethyl 3-ethoxy propionate, and was used as received.

Water Sliding Angles: The water sliding angle was determined as described above for a 75 µl water droplet, and the result was rated on a scale from 1 (worst) to 5 excellent):

| Rating | Sliding Angle |
|---|---|
| 5 | ≤20° |
| 4 | 21-30° |
| 3 | 31-50° |
| 2 | 51-90° |
| 1 | No sliding or water spread on the surface |

Oil Sliding Angles: The oil sliding angle was determined as described above for a 10 µl oil droplet, and the result was rated on a scale from 1 (worst) to 5 excellent):

| Rating | Sliding Angle |
|---|---|
| 5 | ≤15° |
| 4 | 16-20° |
| 3 | 21-25° |
| 2 | 26-90° |
| 1 | No sliding or water spread on the surface |

Optical Properties/Transmittance or Clarity: The optical transmittance (or clarity) of a sample film was tested using a Perkin Elmer Lambda 25 UV-Vis spectrometer, and the result was rated on a scale from 1 (worst) to 5 excellent), with a reference polyurethane without PDMS (or other hydrophobic polymer) having 91% transmittance:

| Rating | Optical Transmittance |
|---|---|
| 5 | >87% |
| 4 | 80-87%. |
| 3 | 71-79% |
| 2 | 60-70% |
| 1 | <60% |

Scratch resistance and permanent ink resistance were evaluated as described above.

Examples 10.1-10.12 (PDMS-2.5K): Master solution A was prepared as 500 mg of PDMS (2.5K) dissolved in 5 mL THF. Master solution B was prepared as 40 mg DBU or Tin catalyst dissolved in 4 mL THF. In a 20 mL glass vial, 470 mg of polyisocyanate(UH80) and 1.88 g of polyol CC-939 were dissolved in 8 mL DMC and stirred for 30 minutes. To this solution the desired amount of the master solution A was added dropwise under stirring at room temperature. The reaction mixture was then stirred for another 30 minutes and desired amount of catalyst was added dropwise from master solution B. After catalyst addition, the coating solution was then stirred for about 30-40 minutes (i.e., until an increased viscosity was visually observed), and then drop cast on glass or metal slides. The coated slides were then dried in ambient condition and cured at 70° C. for 12 hours in an oven. The coating thicknesses were 140±20 µm. The composition and properties of the resulting films are summarized in Table 1 below.

TABLE 1

Composition and Performance of Examples 10.1-10.12

| Example | Catalyst type/amount | Curing ° C. | Water repellency | Oil repellency | Clarity | Ink resist. | Scratch resist. | PDMS wt. % |
|---|---|---|---|---|---|---|---|---|
| 10.1 | DBU/1 mg | 70-80 | 5 | 5 | 5 | 10 | 10 | 6% |
| 10.2 | DBU/2 mg | 70-80 | 5 | 5 | 5 | 10 | 10 | 6% |
| 10.3 | DBU-Tin/ 0.5 + 0.5 mg | 70-80 | 5 | 5 | 5 | 10 | 10 | 6% |
| 10.4 | DBU/2.5 mg | 70-80 | 5 | 5 | 4 | 10 | 10 | 6% |
| 10.5 | DBU/1 mg | 70-80 | 5 | 5 | 5 | 10 | 10 | 4% |
| 10.6 | DBU/2 mg | 70-80 | 5 | 5 | 5 | 10 | 10 | 4% |
| 10.7 | DBU-Tin/ 0.5 + 0.5 mg | 70-80 | 5 | 5 | 5 | 10 | 10 | 4% |
| 10.8 | DBU/2.5 mg | 70-80 | 5 | 5 | 4 | 10 | 10 | 4% |
| 10.9 | DBU/1 mg | 70-80 | 5 | 5 | 5 | 10 | 10 | 2% |
| 10.10 | DBU/2 mg | 70-80 | 5 | 5 | 5 | 10 | 10 | 2% |
| 10.11 | DBU-Tin/ 0.5 + 0.5 mg | 70-80 | 5 | 5 | 5 | 10 | 10 | 2% |
| 10.12 | Tin/1 mg | 70-80 | 5 | 5 | 5 | 10 | 10 | 2% |

Examples 10.13-10.15 (PDMS-1K): Master solution A was prepared as 500 mg of PDMS (1K) dissolved in 5 mL THF. Master solution B was prepared as 40 mg DBU or DABCO catalyst dissolved in 4 mL THF. In a 20 mL glass vial, 470 mg of polyisocyanate(UH80) and 1.88 g of polyol CC-939 were dissolved in 8 mL DMC and stirred for 30 minutes. To this solution, the desired amount of the master solution A was added dropwise under stirring at room temperature. The reaction mixture was then stirred for another 30 minutes and desired amount of catalyst was added dropwise from master solution B. After catalyst addition, the coating solution was then stirred for about 30-40 minutes (i.e., until an increased viscosity was visually observed), and then drop cast on glass or metal slides. The coated slides were then dried in ambient condition and cured at 70° C. for 12 hours in an oven. The coating thicknesses were 140±20 μm. The composition and properties of the resulting films are summarized in Table 2 below.

TABLE 2

Composition and Performance of Examples 10.13-10.15

| Example | Catalyst type/amount | Curing ° C. | Water repellency | Oil repellency | Clarity | Ink resist. | Scratch resist. | PDMS wt. % |
|---|---|---|---|---|---|---|---|---|
| 10.13 | DBU/2.5 mg | 70-80 | 5 | 4 | 5 | 10 | 10 | 6% |
| 10.14 | DBU/5 mg | 70-80 | 5 | 9 | 4 | 9 | 10 | 6% |
| 10.15 | DABCO/5 mg | 70-80 | 5 | 4 | 3 | 6 | 9 | 6% |

Examples 10.16-10.18 (PDMS-2K): Master solution A was prepared as 500 mg of PDMS (2K) dissolved in 5 mL THF. Master solution B was prepared as 40 mg DBU or DABCO catalyst dissolved in 4 mL THF. In a 20 mL glass vial, 470 mg of polyisocyanate(UH80) and 1.88 g of polyol CC-939 were dissolved in 8 mL DMC and stirred for 30 minutes. To this solution, the desired amount of the master solution A was added dropwise under stirring at room temperature. The reaction mixture was then stirred for another 30 minutes and desired amount of catalyst was added dropwise from master solution B. After catalyst addition, the coating solution was then stirred for about 30-40 minutes (i.e., until an increased viscosity was visually observed), and then drop cast on glass or metal slides. The coated slides were then dried in ambient condition and cured at 70° C. for 12 hours in an oven. The coating thicknesses were 140±20 μm. The composition and properties of the resulting films are summarized in Table 3 below.

TABLE 3

Composition and Performance of Examples 10.16-10.18

| Example | Catalyst type/amount | Curing ° C. | Water repellency | Oil repellency | Clarity | Ink resist. | Scratch resist. | PDMS wt. % |
|---|---|---|---|---|---|---|---|---|
| 10.16 | DBU/2.5 mg | 70-80 | 5 | 5 | 5 | 9 | 10 | 6% |
| 10.17 | DABCO/5 mg | 70-80 | 5 | 4 | 4 | 9 | 10 | 6% |
| 10.18 | DBU/5 mg | 70-80 | 5 | 4 | 4 | 10 | 10 | 6% |

Examples 10.19-10.25 (PDMS-2.5K): In 2 mL DMC, 1280 mg HDIT (Desmodur N 100A, 1.1 equ) were dissolved followed by drop wise addition of PDMS 2.5K (50 mg dissolved in 0.1 mL DMC). The solution was stirred for 5 min. Then to this solution 740 mg polyol (MULTRANOL 4011 dissolved in 2 mL DMC, 1.0 equ with respect to HDIT) were added into it drop wisely followed by addition of catalyst (desired amount dissolved in 0.1 mL DMC) were added into it and generally stirred overnight at room temperature. Examples 10.23-24 were stirred for 3 h. The resulting solution was then drop cast and left for solvent evaporation and cured at 70-80° C. for 6 hrs. Samples were prepared at thicknesses in 271±15 μm. The composition and properties of the resulting films are summarized in Table 4 below.

TABLE 4

Composition and Performance of Examples 10.19-10.25

| Example | Catalyst type/amount | Curing ° C. | Water repellency | Oil repellency | Clarity | Ink resist. | Scratch resist. | PDMS wt. % |
|---|---|---|---|---|---|---|---|---|
| 10.19 | DBU/1 mg | 70-80 | 5 | 5 | 4 | 5 | 5 | 2% |
| 10.20 | DBU/2 mg | 70-80 | 5 | 5 | 4 | 5 | 5 | 2% |
| 10.21 | DBU/3 mg | 70-80 | 5 | 5 | 4 | 5 | 5 | 2% |
| 10.22 | DBU/4 mg | 70-80 | 5 | 5 | 4 | 5 | 5 | 2% |
| 10.23 | DBU/5 mg | 70-80 | 5 | 5 | 4 | 5 | 5 | 2% |
| 10.24 | DBU-Tin/ 0.5 + 0.5 mg | 70-80 | 5 | 5 | 4 | 5 | 5 | 2% |
| 10.25 | Tin/1 mg | 70-80 | 5 | 5 | 4 | 5 | 5 | 2% |

Examples 10.26-10.28 (PDMS-1K): In 2 mL DMC, 1280 mg HDIT (Desmodur N 100A) were dissolved followed by drop wise addition of PDMS-1K (50 mg dissolved in 0.1 mL DMC). The solution was stirred for 5 min. Then to this solution 740 mg polyol (MULTRANOL 4011 dissolved in 2 mL DMC, 1.0 equ with respect to HDIT) were added into it drop wisely followed by addition of catalyst (desired amount dissolved in 0.1 mL DMC) were added into it and generally stirred overnight at room temperature. The resulting solution was then drop cast and left for solvent evaporation and cured at 70-80° C. for 6 hrs. Samples were prepared at thicknesses in 271±15 μm. The composition and properties of the resulting films are summarized in Table 5 below.

TABLE 5

Composition and Performance of Examples 10.26-10.28

| Example | Catalyst type/amount | Curing ° C. | Water repellency | Oil repellency | Clarity | Ink resist. | Scratch resist. | PDMS wt. % |
|---|---|---|---|---|---|---|---|---|
| 10.26 | Tin/1 mg | 70-80 | 5 | 5 | 4 | 5 | 5 | 2% |
| 10.27 | Tin/5 mg | 70-80 | 5 | 5 | 4 | 5 | 5 | 2% |
| 10.28 | DBU-Tin/ 0.5 + 0.5 mg | 70-80 | 5 | 5 | 4 | 5 | 5 | 2% |

Examples 10.29-10.31 (PDMS-1K): In 2 mL DMC, 1280 mg HDIT (Desmodur N 100A, 1.1 equ) were dissolved followed by drop wise addition of PDMS-1K (50 mg dissolved in 0.1 mL DMC). The solution was stirred for 5 min. Then to this solution 740 mg polyol (MULTRANOL 4011 dissolved in 2 mL DMC, 1.0 equ with respect to HDIT) were added into it drop wisely followed by addition of catalyst (desired amount dissolved in 0.1 mL DMC) were added into it and stirred overnight at room temperature. The resulting solution was then drop cast and left in open air for solvent evaporation and cured at 70-80° C. for 6 hrs. Samples were prepared at thicknesses in 271±15 μm. The composition and properties of the resulting films are summarized in Table 6 below.

TABLE 6

Composition and Performance of Examples 10.29-10.31

| Example | Catalyst type/amount | Curing ° C. | Water repellency | Oil repellency | Clarity | Ink resist. | Scratch resist. | PDMS wt. % |
|---|---|---|---|---|---|---|---|---|
| 10.29 | Tin/1 mg | 70-80 | 5 | 5 | 4 | 5 | 5 | 2% |
| 10.30 | DBU-Tin/ 0.5 + 0.5 mg | 70-80 | 5 | 5 | 4 | 5 | 5 | 2% |
| 10.31 | DBU-Tin/ 0.5 + 0.5 mg | 70-80 | 5 | 5 | 4 | 5 | 5 | 2% |

Metal Plate Coatings: Selected coating solutions from the above examples were also cast on metal (steel) plates of dimension 4 inch×6 inch (about 10 cm×15 cm). The thicknesses were same as mentioned in their respective examples. The properties of the resulting films are summarized in Table 7 below.

TABLE 7

Performance of Coated Metal Plates

| Example | Water repellency | Oil repellency | Clarity | Ink resist. | Scratch resist. |
|---|---|---|---|---|---|
| 10.1 | 5 | 5 | 5 | 10 | 10 |
| 10.5 | 5 | 5 | 5 | 10 | 10 |
| 10.9 | 5 | 5 | 5 | 10 | 10 |
| 10.12 | 5 | 5 | 5 | 10 | 10 |
| 10.24 | 5 | 5 | 5 | 5 | 5 |
| 10.28 | 5 | 5 | 5 | 5 | 5 |
| 10.31 | 5 | 5 | 5 | 5 | 5 |

*Clarity indicates qualitative numbers based on the visual observation of the coated plates Examples 10.31-10.38 (PDMS-1K Spray Coatings): Master solution A was prepared as 500 mg of PDMS (1K) dissolved in 5 mL THF. Master solution B was prepared as 40 mg DBU or DABCO catalyst dissolved in 4 mL THF. In a 20 mL glass vial, 470 mg of polyisocyanate (UH80) and 1.88 g of polyol CC-939 were dissolved in 8 mL DMC and stirred for 30 minutes. To this solution, the desired amount of the master solution A was added dropwise under stirring at room temperature. The reaction mixture was then stirred for another 30 minutes and desired amount of catalyst was added dropwise from master solution B. After catalyst addition, the coating solution was then stirred for about 30-40 minutes (i.e., until an increased viscosity was visually observed), and then spray coated on glass or metal slides. The coated slides were then dried in ambient condition and cured at 70° C. for 12 hours in an oven. The coating thicknesses were 140±20 μm. The composition and properties of the resulting films are summarized in Table 8 below.

TABLE 8

Composition and Performance of Examples 10.32-10.38

| Example | Catalyst type/amount | Curing ° C. | Water repellency | Oil repellency | Clarity | Ink resist. | Scratch resist. | PDMS wt. % |
|---|---|---|---|---|---|---|---|---|
| 10.32 | DBU/1 mg | 70 | 5 | 5 | 5 | 10 | 10 | 6% |
| 10.33 | DBU/1 mg | 70 | 5 | 5 | 5 | 10 | 10 | 4% |
| 10.34 | DBU/1 mg | 70 | 5 | 5 | 5 | 10 | 10 | 2% |
| 10.35 | DBU/2.5 mg | 70 | 5 | 5 | 5 | 10 | 10 | 6% |
| 10.36 | Tin/1 mg | 70 | 5 | 5 | 5 | 10 | 10 | 4% |
| 10.37 | Tin/1 mg | 70 | 5 | 5 | 5 | 10 | 10 | 2% |
| 10.37 | DBU/2.5 mg | 70 | 5 | 5 | 5 | 10 | 10 | 6% |

Metal Plate Coatings (Spray): Selected coating solutions from the above examples were also sprayed on metal (steel) plates of dimension 4 inch×6 inch (about 10 cm×15 cm). The thicknesses were same as mentioned in their respective examples. The properties of the resulting films are summarized in Table 9 below.

TABLE 9

Performance of Coated Metal Plates

| Example | Water repellency | Oil repellency | Clarity | Ink resist. | Scratch resist. |
|---|---|---|---|---|---|
| 10.24 | 5 | 5 | 5 | 5 | 5 |
| 10.28 | 5 | 5 | 5 | 5 | 5 |

*Clarity indicates qualitative numbers based on the visual observation of the coated plates Example 11—Biobased Optically Clear, Water-, Oil- and Ink-Repellent Fluorine-Free Polyurethane Coatings The following examples illustrate omniphobic water-, oil- and ink-repellent fluorine-free polyurethane coatings derived from partially or fully biobased feedstock. Biobased feedstock polyol/diol was combined with isocyanate (biobased or petroleum based), thus making the coating partially or fully biobased. These examples illustrate the synergy of suitable catalyst, aprotic polar solvents, and the use of reactive groups on polydimethylsiloxane (PDMS), which ensure an optically clear film, with excellent water, oil and ink repellency. In the absence of appropriate catalyst, aprotic polar solvents or reactive group on PDMS, these films are optically not clear. These polyurethane coatings can be readily applied to metal, glass, wood, and fabrics because of the strong adhesive properties of the polyurethanes. The coatings obtained here are durable due to the crosslinked polyurethanes matrix and are optically clear even for relatively thick coatings (e.g., over 100 microns, such as 100-500 microns). Also, other polymers with amine groups such as fluorinated amine can be used instead of PDMS amine. The coating compositions can be can be loaded with nanofillers such as CNC, graphene oxide, nanoclay, silica particles as well to provide self-cleaning composite films. The examples illustrate a cost-effective biobased omniphobic polyurethane composition, which has favorable water-, oil- and ink-repellent properties.

Materials: Acetone (Fisher Thermo Scientific), Dimethyl carbonate (Sigma Aldrich), Bis-(3-aminopropyl)-terminated polydimethylsiloxane (PDMS-2.5K, Mn=2500 g/mol, Sigma-Aldrich), monoaminopropyl terminated polydimethylsiloxane-asymmetric (PDMS-1K, Mn=1000 g/mol, Gelest. INC), monoaminopropyl terminated polydimethylsiloxane-asymmetric (PDMS-2K, Mn=2000 g/mol, Gelest. INC) were purchased and used without further purification. Isosorbide (polyol from Aldrich), hexamethylene diisocyanate trimer (HDIT, UH80, from Sherwin-Williams), pentamethylene diisocyanate trimer (Mitsui Chemicals), 1,8-Diazabicyclo[5.4.0]undec-7-ene ("DBU"), 1,4-Diazabicyclo[2.2.2]octane (DABCO), and Tin(II) 2-ethylhexanoate ("Tin II" or "Tin") were used as received.

Water sliding angle, oil sliding angle, and optical transmittance (or clarity) were determined and rated on a scale of 1-5 as described above in general and for Example 10 (rating scale). Scratch resistance and permanent ink resistance were evaluated as described above.

Examples 11.1-11.4 (PDMS-2K): In a 20 mL glass vial, 0.29 g of Isosorbide was dissolved at 60° C. in 3 mL DMC and 0.5 mL acetone. The solution was then cooled down to room temperature. To this solution, 0.65 mg polyisocyanate (DESMODUR N 100A) and 35 mg (polyol, MULTRANOL 4011) were added dropwise under stirring at room temperature. The reaction mixture was then stirred for 2 minutes and respective amount of DBU catalyst was added. After catalyst addition, the solution was stirred for another 2 minutes and then 0.1 mL (10 mg) of PDMS-2K master solution was added dropwise. The coating solution was then stirred for about 15-20 minutes before drop casting on a glass slide. The coated glass slides were then dried in ambient conditions and cured at 70° C. for 12 hours in an oven. The samples were prepared at thicknesses of 140±10 μm. The composition and properties of the resulting films are summarized in Table 10 below.

TABLE 10

Composition and Performance of Examples 11.1-11.4

| Example | Catalyst type/amount | Curing ° C. | Water repellency | Oil repellency | Clarity | Ink resist. | Scratch resist. | PDMS wt. % |
|---|---|---|---|---|---|---|---|---|
| 11.1 | DBU/5 mg | 70 | 5 | 5 | 4 | 10 | 10 | 3% |
| 11.2 | DBU/3.75 mg | 70 | 5 | 5 | 5 | 10 | 10 | 3% |
| 11.3 | DBU/2.5 mg | 70 | 5 | 5 | 5 | 10 | 10 | 3% |
| 11.4 | DBU/1 mg | 70 | 5 | 5 | 5 | 10 | 10 | 3% |

Examples 11.5-11.6 (PDMS-2K): The procedure for Examples 11.1-11.4 was followed, except that pentamethylene disocyanate timer (which as a 100% biobased material) was used instead of hexamethylene disocyanate timer. The composition and properties of the resulting films are summarized in Table 11 below.

TABLE 11

Composition and Performance of Examples 11.5-11.6

| Example | Catalyst type/amount | Curing ° C. | Water repellency | Oil repellency | Clarity | Ink resist. | Scratch resist. | PDMS wt. % |
|---|---|---|---|---|---|---|---|---|
| 11.5 | DBU/1 mg | 70 | 5 | 5 | 5 | 9 | 10 | 2.7% |
| 11.6 | DBU/2 mg | 70 | 5 | 5 | 5 | 10 | 10 | 2.7% |

Example 12—Ambient-Cured Omniphobic Polyurethane Coatings

The following examples illustrate omniphobic polyurethane coatings prepared under ambient conditions. A suitable combination of urethane curing catalysts, appropriate solvents, and the use of reactive groups on polydimethylsiloxane provide optically clear films with excellent water, oil, and ink repellency. Other examples illustrate the use of mild curing conditions (e.g., 60-80° C.), while these examples illustrate omniphobic polyurethane coatings cured at ambient temperature (e.g., 20-30° C. or about 25° C.). The polyurethane coatings are readily applicable to metal, glass, wood, plastics and fabrics as various substrates because of the strong adhesive properties of the polyurethanes. The obtained coatings are durable due to the cross-linked polyurethanes matrix and are optically clear even for relatively thick coatings (e.g., over 100 microns, such as 100-500 microns). The coating compositions can be used in water-, oil-, anti-fingerprint and anti-graffiti paints. The coating compositions can be can be loaded with nanofillers such as CNC, graphene oxide, nanoclay, silica particles as well to provide self-cleaning composite films. The examples illustrate a cost-effective ambient-curable omniphobic polyurethane composition.

Materials: Acetone (Fisher Thermo Scientific), Dimethyl carbonate (Sigma Aldrich), Bis-(3-aminopropyl)-terminated polydimethylsiloxane (PDMS-2.5K, Mn=2500 g/mol, Sigma-Aldrich), monoaminopropyl terminated polydimethylsiloxane-asymmetric (PDMS-1K, Mn=1000 g/mol, Gelest. INC), monoaminopropyl terminated polydimethylsiloxane-asymmetric (PDMS-2K, Mn=2000 g/mol, Gelest. INC) were purchased and used without further purification. 1,8-Diazabicyclo[5.4.0]undec-7-ene ("DBU"), 1,4-Diazabicyclo[2.2.2]octane (DABCO), Tin(II) 2-ethylhexanoate ("Tin II" or "Tin") were used as received. Polypropylene oxide-based triol (Mn=300 g/mol, MULTRANOL 4011, from Covestro) and poly(hexamethylene diisocyanate) (DESMODUR N 100A from Covestro), acrylic polyol (CC939, Sherwin-Williams) and hexamethylene diisocyanate trimer (HDIT, UH80, from Sherwin-Williams) were used as received. A reducer or solvent mixture (US38, Sherwin-William) is a mixture of n-butyl propionate, n-butyl acetate, ethyl n-amyl ketone, ethyl 3-ethoxy propionate, and was used as received.

Water sliding angle, oil sliding angle, and optical transmittance (or clarity) were determined and rated on a scale of 1-5 as described above in general and for Example 10 (rating scale). Scratch resistance and permanent ink resistance were evaluated as described above.

Examples 12.1-12.4 (PDMS-2.5K): Master solution A was prepared as 500 mg of PDMS (2.5K) dissolved in 5 mL DMC. Master solution B was prepared as 40 mg DBU, DABCO, or Tin catalyst dissolved in 4 mL DMC. In a 20 mL glass vial, 470 mg of polyisocyanate (UH80; 1.1 equiv.) and 1.88 g of polyol (CC-939; 1.0 equiv.) were dissolved in 8 mL DMC and stirred for 30 minutes. To this solution the desired amount (1.5 mL for 150 mg PDMS) of the master solution A was added dropwise under stirring at room temperature. The reaction mixture was then stirred for another 30 minutes and desired amount of catalyst was added dropwise from master solution B. After catalyst addition, the coating solution was then stirred for several hours, and then drop cast on glass or metal slides. The coated slides were then dried and cured in ambient conditions. The coating thicknesses were 140±20 μm. The composition and properties of the resulting films are summarized in Table 12 below.

TABLE 12

| | | | | | | | | |
|---|---|---|---|---|---|---|---|---|
| Composition and Performance of Examples 12.1-12.4 | | | | | | | | |
| Example | Catalyst type/amount | Curing ° C. | Water repellency | Oil repellency | Clarity | Ink resist. | Scratch resist. | PDMS wt. % |
| 12.1 | DBU/1 mg | ambient | 5 | 4 | 5 | 10 | 10 | 6% |
| 12.2 | DBU-Tin/ 0.5 + 0.5 mg | ambient | 5 | 5 | 5 | 10 | 10 | 6% |
| 12.3 | Tin/1 mg | ambient | 5 | 5 | 5 | 10 | 10 | 6% |
| 12.4 | DABCO/5 mg | ambient | 5 | 4 | 5 | 10 | 10 | 6% |

Examples 12.5-12.7 (PDMS-1K): Master solution A was prepared as 500 mg of PDMS (1K) dissolved in 5 mL DMC. Master solution B was prepared as 40 mg DBU, DABCO, or Tin catalyst dissolved in 4 mL DMC. In a 20 mL glass vial, 470 mg of polyisocyanate (UH80; 1.1 equiv.) and 1.88 g of polyol (CC-939; 1.0 equiv.) were dissolved in 8 mL DMC and stirred for 30 minutes. To this solution the desired amount (1.5 mL for 150 mg PDMS) of the master solution A was added dropwise under stirring at room temperature. The reaction mixture was then stirred for another 30 minutes and desired amount of catalyst was added dropwise from master solution B. After catalyst addition, the coating solution was then stirred for several hours, and then drop cast on glass or metal slides after an increased viscosity was visually observed. The coated slides were then dried and cured in ambient conditions. The coating thicknesses were 140±20 μm. The composition and properties of the resulting films are summarized in Table 13 below.

TABLE 13

| | | | | | | | | |
|---|---|---|---|---|---|---|---|---|
| Composition and Performance of Examples 12.5-12.7 | | | | | | | | |
| Example | Catalyst type/amount | Curing ° C. | Water repellency | Oil repellency | Clarity | Ink resist. | Scratch resist. | PDMS wt. % |
| 12.5 | DBU/2.5 mg | ambient | 5 | 4 | 5 | 10 | 10 | 6% |
| 12.6 | DBU/5 mg | ambient | 5 | 4 | 3 | 10 | 10 | 6% |

TABLE 13-continued

Composition and Performance of Examples 12.5-12.7

| Example | Catalyst type/amount | Curing ° C. | Water repellency | Oil repellency | Clarity | Ink resist. | Scratch resist. | PDMS wt. % |
|---|---|---|---|---|---|---|---|---|
| 12.7 | DABCO/5 mg | ambient | 5 | 4 | 5 | 10 | 10 | 6% |

Examples 12.8-12.10 (PDMS-2K): Master solution A was prepared as 500 mg of PDMS (2K) dissolved in 5 mL DMC. Master solution B was prepared as 40 mg DBU, DABCO, or Tin catalyst dissolved in 4 mL DMC. In a 20 mL glass vial, 470 mg of polyisocyanate (UH80; 1.1 equiv.) and 1.88 g of polyol (CC-939; 1.0 equiv.) were dissolved in 8 mL DMC and stirred for 30 minutes. To this solution the desired amount (1.5 mL for 150 mg PDMS) of the master solution A was added dropwise under stirring at room temperature. The reaction mixture was then stirred for another 30 minutes and desired amount of catalyst was added dropwise from master solution B. After catalyst addition, the coating solution was then stirred for several hours, and then drop cast on glass or metal slides after an increased viscosity was visually observed. The coated slides were then dried and cured in ambient conditions. The coating thicknesses were 140±20 µm. The composition and properties of the resulting films are summarized in Table 14 below.

TABLE 14

Composition and Performance of Examples 12.8-12.10

| Example | Catalyst type/amount | Curing ° C. | Water repellency | Oil repellency | Clarity | Ink resist. | Scratch resist. | PDMS wt. % |
|---|---|---|---|---|---|---|---|---|
| 12.8 | DBU/5 mg | ambient | 5 | 4 | 4 | 10 | 10 | 6% |
| 12.9 | DBU/2.5 mg | ambient | 5 | 5 | 5 | 10 | 10 | 6% |
| 12.10 | DABCO/5 mg | ambient | 5 | 5 | 4 | 9 | 10 | 6% |

Examples 12.11-12.18 (PDMS-2.5K): In 2 mL DMC, 1280 mg HDIT (DESMODUR N 100A) were dissolved followed by drop wise addition of PDMS 2.5K (50 mg dissolved in 0.1 mL DMC). The solution was stirred for 5 min. Then to this solution 740 mg polyol (MULTRANOL 4011 dissolved in 2 mL DMC) were added into it drop wisely followed by addition of catalyst and stirred overnight at room temperature. The resulting solution was then drop cast and left for solvent evaporation and cured at room temperature for 48 h. Samples were prepared at thicknesses in 271±15 µm. The composition and properties of the resulting films are summarized in Table 15 below.

TABLE 15

Composition and Performance of Examples 12.11-12.18

| Example | Catalyst type/amount | Curing ° C. | Water repellency | Oil repellency | Clarity | Ink resist. | Scratch resist. | PDMS wt. % |
|---|---|---|---|---|---|---|---|---|
| 12.11 | Tin/1 mg | ambient | 5 | 5 | 5 | 10 | 9 | 2% |
| 12.12 | DBU/1 mg | ambient | 5 | 5 | 5 | 10 | 9 | 2% |
| 12.13 | DBU-Tin/ 0.5 + 0.5 mg | ambient | 5 | 5 | 5 | 10 | 9 | 2% |
| 12.14 | DABCO/ 1 mg | ambient | 5 | 5 | 4 | 10 | 10 | 2% |
| 12.15 | Tin/1 mg | ambient | 5 | 5 | 5 | 10 | 9 | 0.5% |
| 12.16 | DBU/1 mg | ambient | 5 | 5 | 5 | 10 | 9 | 0.5% |
| 12.17 | DBU-Tin/ 0.5 + 0.5 mg | ambient | 5 | 5 | 5 | 10 | 9 | 0.5% |
| 12.18 | DABCO/ 1 mg | ambient | 5 | 5 | 4 | 10 | 10 | 0.5% |

Examples 12.19-12.22 (PDMS-1K): Examples 12.19-12.22 were prepared in the same way as Examples 12.11-12.18, but with PDMS-1K instead of PDMS-2.5K. Samples were prepared at thicknesses in 271±15 µm. The composition and properties of the resulting films are summarized in Table 16 below.

TABLE 16

Composition and Performance of Examples 12.19-12.22

| Example | Catalyst type/amount | Curing ° C. | Water repellency | Oil repellency | Clarity | Ink resist. | Scratch resist. | PDMS wt. % |
|---|---|---|---|---|---|---|---|---|
| 12.19 | Tin/1 mg | ambient | 5 | 5 | 4 | 10 | 9 | 2% |
| 12.20 | Tin/5 mg | ambient | 5 | 5 | 4 | 10 | 9 | 2% |
| 12.21 | DBU-Tin/ 0.5 + 0.5 mg | ambient | 5 | 5 | 4 | 10 | 9 | 2% |
| 12.22 | No catalyst | ambient | 5 | 5 | 4 | 10 | 9 | 2% |

Examples 12.23-12.26 (PDMS-2K): Examples 12.23-12.26 were prepared in the same way as Examples 12.11-12.18, but with PDMS-2K instead of PDMS-2.5K. Samples were prepared at thicknesses in 271±15 μm. The composition and properties of the resulting films are summarized in Table 17 below.

TABLE 17

Composition and Performance of Examples 12.23-12.26

| Example | Catalyst type/amount | Curing ° C. | Water repellency | Oil repellency | Clarity | Ink resist. | Scratch resist. | PDMS wt. % |
|---|---|---|---|---|---|---|---|---|
| 12.23 | Tin/1 mg | ambient | 5 | 5 | 4 | 10 | 9 | 2% |
| 12.24 | Tin/5 mg | ambient | 5 | 5 | 4 | 10 | 9 | 2% |
| 12.25 | DBU-Tin/ 0.5 + 0.5 mg | ambient | 5 | 5 | 4 | 10 | 9 | 2% |
| 12.26 | No catalyst | ambient | 5 | 5 | 4 | 10 | 9 | 2% |

Metal Plate Coatings: Selected coating solutions from the above examples were also cast on metal (steel) plates of dimension 4 inch×6 inch (about 10 cm×15 cm). The thicknesses were same as mentioned in their respective examples. The properties of the resulting films are summarized in Table 18 below.

TABLE 18

Performance of Coated Metal Plates

| Example | Water repellency | Oil repellency | Clarity | Ink resist. | Scratch resist. |
|---|---|---|---|---|---|
| 12.2 | 5 | 5 | 5 | 10 | 10 |
| 12.13 | 5 | 5 | 5 | 10 | 9 |
| 12.17 | 5 | 5 | 5 | 10 | 9 |
| 12.21 | 5 | 5 | 5 | 10 | 10 |
| 12.24 | 5 | 5 | 5 | 10 | 10 |

*Clarity indicates qualitative numbers based on the visual observation of the coated plates Metal Plate Coatings (Spray): Selected coating solutions from the above examples were also sprayed on metal (steel) plates of dimension 4 inch×6 inch (about 10 cm×15 cm). The thicknesses were same as mentioned in their respective examples. The properties of the resulting films are summarized in Table 19 below.

TABLE 19

Performance of Coated Metal Plates

| Example | Water repellency | Oil repellency | Clarity | Ink resist. | Scratch resist. |
|---|---|---|---|---|---|
| 12.2 | 5 | 5 | 5 | 10 | 10 |
| 12.13 | 5 | 5 | 5 | 10 | 9 |
| 12.17 | 5 | 5 | 5 | 10 | 9 |
| 12.21 | 5 | 5 | 5 | 10 | 10 |
| 12.24 | 5 | 5 | 5 | 10 | 10 |

*Clarity indicates qualitative numbers based on the visual observation of the coated plates Examples 12.27-12.31 (PDMS-2.5K Spray Coating): Examples 12.27-12.31 were prepared in the same way as Examples 12.1-12.4, but with twice the amount of solvent used (i.e., solutions were prepared at half the concentration noted above) and with spraying of the coating solution onto a test substrate. The composition and properties of the resulting films are summarized in Table 20 below.

TABLE 20

Composition and Performance of Examples 12.27-12.31

| Example | Catalyst type/amount | Curing ° C. | Water repellency | Oil repellency | Clarity | Ink resist. | Scratch resist. | PDMS wt. % |
|---|---|---|---|---|---|---|---|---|
| 12.27 | DBU/1 mg | ambient | 5 | 5 | 5 | 10 | 10 | 6% |
| 12.28 | DBU/1 mg | ambient | 5 | 5 | 5 | 10 | 10 | 4% |
| 12.29 | DBU/1 mg | ambient | 5 | 5 | 5 | 10 | 10 | 2% |
| 12.30 | DBU-Tin/ 0.5 + 0.5 mg | ambient | 5 | 5 | 5 | 10 | 10 | 4% |
| 12.31 | Tin/1 mg | ambient | 5 | 5 | 5 | 10 | 10 | 2% |

Example 13—Solvent-Independent, Ambient-Cured Omniphobic Polyurethanes Coatings The following examples illustrate omniphobic polyurethane coatings prepared under ambient conditions using a variety of diluents. The use of urethane with siloxanes with different reducers/diluents ensured optically clear film, with excellent water, oil and ink repellency. These examples illustrate ambient temperature-cured omniphobic polyurethane coatings using common commercial solvents such as ketones (methyl n-propyl ketone, methyl isobutyl ketone, methyl ethyl ketone), esters (n-butyl propionate, n-butyl acetate, ethyl n-amyl ketone, ethyl 3-ethoxy propionate) instead of polar non-protic organic solvents such as dimethyl carbonates. The polyurethane coatings are readily applicable to metal, glass, wood, plastics and fabrics as various substrates because of the strong adhesive properties of the polyurethanes. The obtained coatings are durable due to the cross-linked polyurethanes matrix and are optically clear even for relatively thick coatings (e.g., over 100 microns, such as 100-500 microns). The coating compositions can be used in water-, oil-, anti-fingerprint and anti-graffiti paints. The coating compositions can be can be loaded with nano-fillers such as CNC, graphene oxide, nanoclay, silica particles as well to provide self-cleaning composite films. The examples illustrate a cost-effective ambient-curable omniphobic polyurethane composition, which is compatible with commercial diluents/solvents, for example as commonly used in commercial paint/coating compositions.

Materials: Acetone (Fisher Thermo Scientific), Dimethyl carbonate (Sigma Aldrich), Bis-(3-aminopropyl)-terminated polydimethylsiloxane (PDMS-2.5K, Mn=2500 g/mol, Sigma-Aldrich), monoaminopropyl terminated polydimethylsiloxane-asymmetric (PDMS-1K, Mn=1000 g/mol, Gelest. INC), monoaminopropyl terminated polydimethylsiloxane-asymmetric (PDMS-2K, Mn=2000 g/mol, Gelest. INC) were purchased and used without further purification. 1,8-Diazabicyclo[5.4.0]undec-7-ene ("DBU"), 1,4-Diazabicyclo[2.2.2]octane (DABCO), Tin(II) 2-ethylhexanoate ("Tin II" or "Tin") were used as received. Polypropylene oxide-based triol (Mn=300 g/mol, MULTRANOL 4011, from Covestro) and poly(hexamethylene diisocyanate) (DESMODUR N 100A from Covestro), acrylic polyol (CC939, Sherwin-Williams) and hexamethylene diisocyanate trimer (UH80, from Sherwin-Williams) were used as received. A reducer or solvent mixture (US38, Sherwin-William) is a mixture of n-butyl propionate, n-butyl acetate, ethyl n-amyl ketone, ethyl 3-ethoxy propionate, and was used as received.

Water sliding angle, oil sliding angle, and optical transmittance (or clarity) were determined and rated on a scale of 1-5 as described above in general and for Example 10 (rating scale). Scratch resistance and permanent ink resistance were evaluated as described above.

Examples 13.1-13.21 (PDMS-2.5K): 1880 mg polyol CC939 and 1 mL reducer (US38) were mixed followed by the addition of PDMS 2.5K (dissolved in 0.1 mL Reducer US38) drop wisely into it. Then to this solution 470 mg HDIT (UH80) (dissolved in 0.9 mL of US38) was added drop wisely into it under continuous stirring. Then it was stirred for 5 min, followed by the addition of catalyst (dissolved in 0.1 mL US38) were added into it and stirred for 2-6 h at room temperature. The final sample was then drop cast on glass slide and left for solvent evaporation and then cured in oven at 70° C. for 6 hrs or dried overnight at room temperature. Coatings were prepared in the final thicknesses of 157±15 μm. The composition and properties of the resulting films are summarized in Table 21 below.

TABLE 21

Composition and Performance of Examples 13.1-13.21

| Example | Catalyst type/amount | Curing ° C. | Water repellency | Oil repellency | Clarity | Ink resist. | Scratch resist. | PDMS wt. % |
|---|---|---|---|---|---|---|---|---|
| 13.1 | DBU/1 mg | 70 | 5 | 5 | 5 | 10 | 10 | 2% |
| 13.2 | DBU/2 mg | 70 | 5 | 5 | 5 | 10 | 10 | 2% |
| 13.3 | DBU/3 mg | 70 | 5 | 5 | 5 | 10 | 10 | 2% |
| 13.4 | DBU/4 mg | 70 | 5 | 5 | 5 | 10 | 10 | 2% |
| 13.5 | DBU/5 mg | 70 | 5 | 5 | 5 | 10 | 10 | 2% |
| 13.6 | DBU-Tin/ 0.5 + 0.5 mg | 70 | 5 | 5 | 5 | 10 | 10 | 2% |
| 13.7 | DBU-Tin/ 1 + 1 mg | 70 | 5 | 5 | 5 | 10 | 10 | 2% |
| 13.8 | Tin/1 mg | 70 | 5 | 5 | 5 | 10 | 10 | 2% |
| 13.9 | Tin/5 mg | 70 | 5 | 5 | 5 | 10 | 10 | 2% |
| 13.10 | No catalyst | ambient | 5 | 5 | 5 | 10 | 10 | 2% |
| 13.11 | DBU/1 mg | 70 | 5 | 5 | 5 | 10 | 10 | 0.5% |
| 13.12 | DBU-Tin/ 0.5 + 0.5 mg | 70 | 5 | 5 | 5 | 10 | 10 | 0.5% |
| 13.13 | DBU-Tin/ 0.5 + 0.5 mg | 70 | 5 | 5 | 5 | 10 | 10 | 0.5% |
| 13.14 | Tin/1 mg | 70 | 5 | 5 | 5 | 10 | 10 | 0.5% |
| 13.15 | No catalyst | ambient | 5 | 5 | 5 | 10 | 10 | 0.5% |
| 13.16 | DBU-Tin/ 0.5 + 0.5 mg | 70 | 5 | 5 | 5 | 10 | 10 | 4% |
| 13.17 | Tin/1 mg | 70 | 5 | 5 | 5 | 10 | 10 | 4% |
| 13.18 | No catalyst | ambient | 5 | 5 | 5 | 10 | 10 | 4% |
| 13.19 | DBU-Tin/ 0.5 + 0.5 mg | 70 | 5 | 5 | 5 | 10 | 10 | 6% |
| 13.20 | Tin/1 mg | 70 | 5 | 5 | 5 | 10 | 10 | 6% |
| 13.21 | No catalyst | ambient | 5 | 5 | 5 | 10 | 10 | 6% |
| 13.22 | DBU-Tin/ 0.5 + 0.5 mg | ambient | 5 | 5 | 5 | 10 | 10 | 4% |
| 13.23 | Tin/1 mg | ambient | 5 | 5 | 5 | 10 | 10 | 4% |
| 13.24 | No catalyst | ambient | 5 | 5 | 5 | 10 | 10 | 4% |

Examples 13.25-13.36 (PDMS-1K): Examples 13.25-13.36 were prepared in the same way as Examples 13.1-13.24, but with PDMS-1K instead of PDMS-2.5K. Samples were prepared at thicknesses in 157±15 μm. The composition and properties of the resulting films are summarized in Table 22 below.

TABLE 22

Composition and Performance of Examples 13.25-13.36

| Example | Catalyst type/amount | Curing ° C. | Water repellency | Oil repellency | Clarity | Ink resist. | Scratch resist. | PDMS wt. % |
|---|---|---|---|---|---|---|---|---|
| 13.25 | Tin/1 mg | 70 | 5 | 5 | 4 | 10 | 10 | 2% |
| 13.26 | DBU-Tin/ 0.5 + 0.5 mg | 70 | 5 | 5 | 4 | 10 | 10 | 2% |
| 13.27 | No catalyst | 70 | 5 | 5 | 4 | 10 | 10 | 2% |
| 13.28 | Tin/1 mg | 70 | 5 | 5 | 5 | 10 | 10 | 0.5% |
| 13.29 | DBU-Tin/ 0.5 + 0.5 mg | 70 | 5 | 5 | 5 | 10 | 10 | 0.5% |
| 13.30 | No catalyst | 70 | 5 | 5 | 4 | 10 | 10 | 0.5% |
| 13.31 | Tin/1 mg | ambient | 5 | 5 | 4 | 10 | 10 | 2% |
| 13.32 | DBU-Tin/ 0.5 + 0.5 mg | ambient | 5 | 5 | 4 | 10 | 10 | 2% |
| 13.33 | No catalyst | ambient | 5 | 5 | 4 | 10 | 10 | 2% |
| 13.34 | Tin/1 mg | ambient | 5 | 5 | 5 | 10 | 10 | 0.5% |
| 13.35 | DBU-Tin/ 0.5 + 0.5 mg | ambient | 5 | 5 | 5 | 10 | 10 | 0.5% |
| 13.36 | No catalyst | ambient | 5 | 5 | 4 | 10 | 10 | 0.5% |

Examples 13.37-13.39 (PDMS-2K): Examples 13.37-13.19 were prepared in the same way as Examples 13.1-13.24, but with PDMS-2K instead of PDMS-2.5K. Samples were prepared at thicknesses in 157±15 μm. The composition and properties of the resulting films are summarized in Table 23 below.

TABLE 23

Composition and Performance of Examples 13.37-13.39

| Example | Catalyst type/amount | Curing ° C. | Water repellency | Oil repellency | Clarity | Ink resist. | Scratch resist. | PDMS wt. % |
|---|---|---|---|---|---|---|---|---|
| 13.37 | Tin/1 mg | 70 | 5 | 5 | 4 | 10 | 10 | 2% |
| 13.38 | DBU-Tin/ 0.5 + 0.5 mg | 70 | 5 | 5 | 4 | 10 | 10 | 2% |
| 13.39 | DBU-Tin/ 0.5 + 0.5 mg | 70 | 5 | 5 | 4 | 10 | 10 | 2% |

Examples 13.40-13.47 (PDMS-2.5K): In 2 ml 2-Butanone, 1280 mg of HDIT (DESMODUR N 100A) were dissolved followed by drop wise addition of PDMS 2.5K (dissolved in 0.2 mL 2-Butanone). The solution was stirred for 5 min. Then to this solution 740 mg of polyol (MULTRANOL 4011 dissolved in 2 mL 2-Butanone) were added into it drop wisely followed by addition of catalyst (dissolved in 0.1 mL 2-Butanone) were added into it and stirred overnight at room temperature. The resulting solutions were then drop cast and left for solvent evaporation and cured at room temperature overnight (ambient cured) or at 70° C. for 6 h (oven cured). Samples were prepared at thicknesses in 271±15 μm. The composition and properties of the resulting films are summarized in Table 24 below.

TABLE 24

Composition and Performance of Examples 13.40-13.47

| Example | Catalyst type/amount | Curing ° C. | Water repellency | Oil repellency | Clarity | Ink resist. | Scratch resist. | PDMS wt. % |
|---|---|---|---|---|---|---|---|---|
| 13.40 | Tin/1 mg | ambient | 5 | 5 | 4 | 10 | 10 | 2% |
| 13.41 | DBU/1 mg | ambient | 5 | 5 | 4 | 10 | 10 | 2% |
| 13.42 | DBU-Tin/ 0.5 + 0.5 mg | ambient | 5 | 5 | 4 | 10 | 10 | 2% |
| 13.43 | No catalyst | ambient | 5 | 5 | 4 | 10 | 10 | 2% |
| 13.44 | Tin/1 mg | 70 | 5 | 5 | 4 | 10 | 10 | 2% |
| 13.45 | DBU/1 mg | 70 | 5 | 5 | 4 | 10 | 10 | 2% |
| 13.46 | DBU-Tin/ 0.5 + 0.5 mg | 70 | 5 | 5 | 4 | 10 | 10 | 2% |
| 13.47 | No catalyst | 70 | 5 | 5 | 4 | 10 | 10 | 2% |

Examples 13.48-13.53 (PDMS-1K): Examples 13.48-13.53 were prepared in the same way as Examples 13.40-13.47, but with PDMS-1K instead of PDMS-2.5K. Samples were prepared at thicknesses in 271±15 µm. The composition and properties of the resulting films are summarized in Table 25 below.

TABLE 25

Composition and Performance of Examples 13.48-13.53

| Example | Catalyst type/amount | Curing °C. | Water repellency | Oil repellency | Clarity | Ink resist. | Scratch resist. | PDMS wt. % |
|---|---|---|---|---|---|---|---|---|
| 13.48 | Tin/1 mg | ambient | 5 | 4 | 4 | 10 | 10 | 2% |
| 13.49 | DBU/1 mg | ambient | 5 | 5 | 4 | 10 | 10 | 2% |
| 13.50 | DBU-Tin/ 0.5 + 0.5 mg | ambient | 5 | 5 | 4 | 10 | 10 | 2% |
| 13.51 | DBU-Tin/ 0.5 + 0.5 mg | 70 | 5 | 5 | 4 | 10 | 10 | 2% |
| 13.52 | Tin/1 mg | 70 | 5 | 5 | 4 | 10 | 10 | 2% |
| 13.53 | No catalyst | 70 | 5 | 5 | 4 | 10 | 10 | 2% |

Examples 13.54-13.59 (PDMS-2K): Examples 13.54-13.59 were prepared in the same way as Examples 13.40-13.47, but with PDMS-2K instead of PDMS-2.5K. Samples were prepared at thicknesses in 271±15 µm. The composition and properties of the resulting films are summarized in Table 26 below.

TABLE 26

Composition and Performance of Examples 13.54-13.59

| Example | Catalyst type/amount | Curing °C. | Water repellency | Oil repellency | Clarity | Ink resist. | Scratch resist. | PDMS wt. % |
|---|---|---|---|---|---|---|---|---|
| 13.54 | Tin/1 mg | 70 | 5 | 4 | 4 | 10 | 10 | 2% |
| 13.55 | DBU/1 mg | 70 | 5 | 5 | 4 | 10 | 10 | 2% |
| 13.56 | DBU-Tin/ 0.5 + 0.5 mg | 70 | 5 | 5 | 4 | 10 | 10 | 2% |
| 13.57 | Tin/1 mg | ambient | 5 | 5 | 4 | 10 | 10 | 2% |
| 13.58 | DBU/1 mg | ambient | 5 | 5 | 4 | 10 | 10 | 2% |
| 13.59 | DBU-Tin/ 0.5 + 0.5 mg | ambient | 5 | 5 | 4 | 10 | 10 | 2% |

Examples 13.60-13.71 (PDMS-2.5K): Examples 13.54-13.59 were prepared in the same way as Examples 13.40-13.47, but with PDMS-2K instead of PDMS-2.5K. Samples were prepared at thicknesses in 271±15 µm. The composition and properties of the resulting films are summarized in Table 27 below.

TABLE 27

Composition and Performance of Examples 13.60-13.71

| Example | Catalyst type/amount | Curing °C. | Water repellency | Oil repellency | Clarity | Ink resist. | Scratch resist. | PDMS wt. % |
|---|---|---|---|---|---|---|---|---|
| 13.60 | Tin/1 mg | ambient | 5 | 5 | 4 | 10 | 10 | 2% |
| 13.61 | DBU-Tin/ 0.5 + 0.5 mg | ambient | 5 | 5 | 4 | 10 | 10 | 2% |
| 13.62 | DABCO/ 1 mg | ambient | 5 | 5 | 4 | 10 | 10 | 2% |
| 13.63 | No catalyst | 70 | 5 | 5 | 4 | 10 | 10 | 2% |
| 13.64 | Tin/1 mg | 70 | 5 | 5 | 4 | 10 | 10 | 2% |
| 13.65 | DBU-Tin/ 0.5 + 0.5 mg | 70 | 5 | 5 | 4 | 10 | 10 | 2% |
| 13.66 | DABCO/ 1 mg | 70 | 5 | 5 | 4 | 10 | 10 | 2% |
| 13.67 | No catalyst | 70 | 5 | 5 | 4 | 10 | 10 | 2% |
| 13.68 | Tin/1 mg | 70 | 5 | 5 | 4 | 10 | 10 | 0.5% |
| 13.69 | DBU-Tin/ 0.5 + 0.5 mg | 70 | 5 | 5 | 5 | 10 | 10 | 0.5% |

TABLE 27-continued

Composition and Performance of Examples 13.60-13.71

| Example | Catalyst type/amount | Curing °C. | Water repellency | Oil repellency | Clarity | Ink resist. | Scratch resist. | PDMS wt. % |
|---|---|---|---|---|---|---|---|---|
| 13.70 | DABCO/ 1 mg | 70 | 5 | 5 | 5 | 10 | 10 | 0.5% |
| 13.71 | No catalyst | 70 | 5 | 5 | 5 | 10 | 10 | 0.5% |

Examples 13.72-13.77 (PDMS-2.5K): Three different nano-filler mixtures were formed: 1) Nano-clay Bentonite (Nano-B), 25 mg dissolved in 0.5 mL US3 reducer; 2) Nano-clay surface modified with Trimethyl Stearyl Ammonium (Nano-T), 25 mg dissolved in 0.5 mL US3 reducer; and 3) cellulose nanocrystals (CNC), 25 mg dissolved in 0.5 mL US3 reducer. Coating procedure: In 1 g US3 reducer, 1880 mg of polyol CC-939 was dissolved. Then to this solution 470 mg of UH80 dissolved in 0.9 g US3 reducer was added dropwise, followed by addition of PDMS-2.5K (20 mg in 0.1 ml US3 reducer) dropwise. It was then stirred for 15 min and then nano-fillers solution was added and stirred for 30 minutes. At this point, 1 mg Tin II catalyst dissolved in 0.1 mL US3 reducer was added and stirred it for 2 hr at room/ambient temperature. After 2 hours, the solution becomes relatively viscous and was drop casted on glass slides and left to dry at ambient conditions. Half of the samples were cured at ambient temperature and another half at 70° C. The composition and properties of the resulting composite films are summarized in Table 28 below.

TABLE 28

Composition and Performance of Examples 13.72-13.77

| Example | Nanofiller | Curing °C. | % Transmittance | Water Sliding Angle | Oil Sliding Angle | Scratch resist. | Comment |
|---|---|---|---|---|---|---|---|
| 13.72 | CNC 1 wt % | Ambient | 87.4 | 13° | 15° | Excellent | CNC phase separation |
| 13.73 | CNC 1 wt % | 70 | 83 | 11° | 14° | Excellent | CNC phase separation |
| 13.74 | Nano-B 1 wt % | Ambient | 86.2 | 13° | 17° | Excellent | |
| 13.75 | Nano-B 1 wt % | 70 | 86.3 | 10° | 12° | Excellent | |
| 13.76 | Nano-T 1 wt % | Ambient | 88.4 | 13° | 18° | Excellent | |
| 13.77 | Nano-T 1 wt % | 70 | 88.7 | 11° | 12° | Excellent | |

Metal Plate Coatings: Selected coating solutions from the above examples were also cast on metal (steel) plates of dimension 4 inch×6 inch (about 10 cm×15 cm). The thicknesses were same as mentioned in their respective examples. The properties of the resulting films are summarized in Table 29 below.

TABLE 29

Performance of Coated Metal Plates

| Example | Water repellency | Oil repellency | Clarity | Ink resist. | Scratch resist. |
|---|---|---|---|---|---|
| 13.6 | 5 | 5 | 5 | 10 | 10 |
| 13.10 | 5 | 5 | 5 | 10 | 10 |
| 13.12 | 5 | 5 | 5 | 10 | 10 |
| 13.15 | 5 | 5 | 5 | 10 | 10 |
| 13.16 | 5 | 5 | 5 | 10 | 10 |
| 13.18 | 5 | 5 | 5 | 10 | 10 |
| 13.24 | 5 | 5 | 5 | 10 | 10 |

*Clarity indicates qualitative numbers based on the visual observation of the coated plates Metal Plate Coatings (Spray): Selected coating solutions from the above examples were also sprayed on metal (steel) plates of dimension 4 inch×6 inch (about 10 cm×15 cm). The thicknesses were same as mentioned in their respective examples. The properties of the resulting films are summarized in Table 30 below.

TABLE 30

Performance of Coated Metal Plates

| Example | Water repellency | Oil repellency | Clarity | Ink resist. | Scratch resist. |
|---|---|---|---|---|---|
| 13.6 | 5 | 5 | 5 | 10 | 10 |
| 13.12 | 5 | 5 | 5 | 10 | 10 |
| 13.15 | 5 | 5 | 5 | 10 | 10 |
| 13.18 | 5 | 5 | 5 | 10 | 10 |

*Clarity indicates qualitative numbers based on the visual observation of the coated plates Examples 13.78-13.81 (PDMS-2.5K Spray Coatings): Coating solutions were prepared in the same way as above for Examples 13.1-13.21, and they were sprayed on a PVC pipe substrate. The composition and properties of the resulting films are summarized in Table 31 below.

TABLE 31

Composition and Performance of Examples 13.78-13.81

| Example | Catalyst type/amount | Curing ° C. | Water repellency | Oil repellency | Clarity | Ink resist. | Scratch resist. | PDMS wt. % |
|---|---|---|---|---|---|---|---|---|
| 13.78 | Tin/1 mg | 70 | 5 | 5 | 5 | 10 | 10 | 4% |
| 13.79 | Tin/1 mg | ambient | 5 | 5 | 5 | 10 | 10 | 4% |
| 13.80 | Tin/1 mg | 70 | 5 | 5 | 5 | 10 | 10 | 4% |
| 13.81 | Tin/1 mg | ambient | 5 | 5 | 5 | 10 | 10 | 4% |

*Clarity indicates qualitative numbers based on the visual observation of the coated plastic Example 14—Omniphobic Polyurethane Coatings on 3D Printed Substrates This example illustrates omniphobic polyurethane coatings according to the disclosure as 3D printed article substrate. Traditionally, 3D printing suffers three disadvantages: 1) water/liquid leakage, 2) rough surfaces, and 3) mechanically weak, which can result from the generally porous, rough, and matte surfaces of 3D printed materials. Objects printed with poly(lactic acid) (PLA) also have low mechanical strength. Application of coatings according to the disclosure on the surface of 3D printed objects can solve these problems, for example providing coated materials having better barrier properties, smooth, shiny surface, and improved mechanical strength.

In a 20 mL glass vial, 470 mg of isocyanate HDIT (UH80) was dissolved in 2 mL reducer (US3), and 1 mL acrylic polyol CC-939 was added to it under stirring. At this point, 100 mg of amino-functional PDMS dissolved in 0.5 mL reducer was added dropwise to the reaction mixture. The solution was stirred at room temperature for about 30 minutes. After stirring, Tin(II) ethylhexanoate catalyst (2.5 mg) was added and stirred for another 30 minutes to get appropriate viscosity. The solution was then drop casted onto a 3D printed material surface. The coated samples were then cured at room temperature overnight. The next day, properties of the coated objects were evaluated.

The coated materials were shinier than uncoated materials. The coatings also significantly improved barrier properties of the printed 3D objects in comparison to the uncoated porous material. The coatings also demonstrated anti-smudge properties and had improved mechanical properties. The coatings also had improved repellency properties, with a water sliding angle of 13-14°, an oil sliding angle of 19°, and a hexadecane sliding angle of 18°.

Because other modifications and changes varied to fit particular operating requirements and environments will be apparent to those skilled in the art, the disclosure is not considered limited to the example chosen for purposes of illustration, and covers all changes and modifications which do not constitute departures from the true spirit and scope of this disclosure.

Accordingly, the foregoing description is given for clearness of understanding only, and no unnecessary limitations should be understood therefrom, as modifications within the scope of the disclosure may be apparent to those having ordinary skill in the art.

All patents, patent applications, government publications, government regulations, and literature references cited in this specification are hereby incorporated herein by reference in their entirety. In case of conflict, the present description, including definitions, will control.

Throughout the specification, where the compositions, processes, kits, or apparatus are described as including components, steps, or materials, it is contemplated that the compositions, processes, or apparatus can also comprise, consist essentially of, or consist of, any combination of the recited components or materials, unless described otherwise. Component concentrations can be expressed in terms of weight concentrations, unless specifically indicated otherwise. Combinations of components are contemplated to include homogeneous and/or heterogeneous mixtures, as would be understood by a person of ordinary skill in the art in view of the foregoing disclosure.

What is claimed is:

1. A method for forming a thermoset omniphobic composition, the method comprising:
   (a) reacting at least one polyisocyanate, at least one amine-functional hydrophobic polymer having a glass transition temperature ($T_g$) of 50° C. or less, and at least one polyol to form a partially crosslinked reaction product; and
   (b) curing the partially crosslinked reaction product to form the thermoset omniphobic composition;
   wherein the thermoset omniphobic composition is fluorine-free.

2. The method of claim 1, wherein the polyisocyanate comprises a diisocyanate.

3. The method of claim 1, wherein the polyisocyanate comprises a triisocyanate.

4. The method of claim 1, wherein the polyisocyanate is selected from the group consisting of 1,5-naphthylene diisocyanate, 4,4'-diphenylmethane diisocyanate (MDI), hydrogenated MDI, xylene diisocyanate (XDI), tetramethylxylol diisocyanate (TMXDI), 4,4'-diphenyl-dimethyl-methane diisocyanate, di- and tetraalkyl-diphenylmethane diisocyanate, 4,4'-dibenzyl diiso-cyanate, 1,3-phenylene diisocyanate, 1,4-phenylene diisocyanate, one or more isomers of tolylene diisocyanate (TDI), 1-methyl-2,4-diiso-cyanato-cyclohexane, 1,6-diisocyanato-2,2,4-trimethyl-hexane, 1,6-diisocyanato-2,4,4-trimethylhexane, 1-iso-cyanatomethyl-3-isocyanato-1,5,5-trimethylcyclohexane, chlorinated and brominated diisocyanates, phosphorus-containing diisocyanates, tetramethoxybutane 1,4-diisocyanate, butane 1,4-diisocyanate, hexane 1,6-diisocyanate (HDI), HDI dimer (HDID), HDI trimer (HDIT), HDI biuret, dicyclohexylmethane diisocyanate, cyclohexane 1,4-diisocyanate, ethylene diisocyanate, phthalic acid bisisocyanatoethyl ester, 1-chloromethylphenyl 2,4-diisocyanate, 1-bromomethylphenyl 2,6-diisocyanate, 3,3-bischloromethyl ether 4,4'-diphenyl-diisocyanate, trimethylhexamethylene diisocyanate, 1,4-diisocyanato-butane, 1,2-diisocyanatododecane, and combinations thereof.

5. The method of claim 1, wherein the amine-functional hydrophobic polymer is selected from the group consisting of amine-functional polysiloxanes, amine-functional polybutadienes, amine-functional polyisobutenes, amine-functional branched polyolefins, amine-functional poly(meth)acrylates and combinations thereof.

6. The method of claim 1, wherein the amine-functional hydrophobic polymer comprises a monoamine-functional polysiloxane.

7. The method of claim 1, wherein the amine-functional hydrophobic polymer comprises a diamine-functional polysiloxane.

8. The method of claim 1, wherein:
the amine-functional hydrophobic polymer has a glass transition temperature in a range from −150° C. to 50° C.;
the amine-functional hydrophobic polymer is a liquid at a temperature in a range from −20° C. to 40° C.; and
the amine-functional hydrophobic polymer has a molecular weight ranging from 300 to 50,000.

9. The method of claim 1, wherein the polyol comprises a diol.

10. The method of claim 1, wherein the polyol comprises three or more hydroxyl groups.

11. The method of claim 1, wherein the polyol is selected from the group consisting of polyether polyols, hydroxlated (meth)acrylate oligomers, glycerol, ethylene glycol, diethylene glycol, triethylene glycol, tetraethylene glycol, propylene glycol, dipropylene glycol, tripropylene glycol, 1,3-propanediol, 1,3-butanediol, 1,4-butanediol, neopentyl glycol, 1,6-hexanediol, 1,4-cyclohexanedimethanol, glycerol, trimethylolpropane, 1,2,6-hexanetriol, pentaerythritol, (meth)acrylic polyols, polyester polyols, polyurethane polyols, and combinations thereof.

12. The method of claim 1, wherein at least one of the polyisocyanate and the polyol comprises a biobased polyisocyanate or a biobased polyol, respectively.

13. The method of claim 1, wherein:
the at least one polyisocyanate is present in an amount ranging from 10 wt. % to 90 wt. % relative to a combined amount of the at least one polyisocyanate, the at least one amine-functional hydrophobic polymer, and the at least one polyol in part (a);
the at least one amine-functional hydrophobic polymer is present in an amount ranging from 0.01 wt. % to 20 wt. % relative to the combined amount of the at least one polyisocyanate, the at least one amine-functional hydrophobic polymer, and the at least one polyol in part (a); and
the at least one polyol is present in an amount ranging from 10 wt. % to 90 wt. % relative to the combined amount of the at least one polyisocyanate, the at least one amine-functional hydrophobic polymer, and the at least one polyol in part (a).

14. The method of claim 1, further comprising: reacting at least one monoisocyanate monomer with the at least one polyisocyanate, the at least one amine-functional hydrophobic polymer, and the at least one polyol in part (a).

15. The method of claim 1, further comprising:
adding one or more additives to the at least one polyisocyanate, the at least one amine-functional hydrophobic polymer, and the at least one polyol in part (a);
wherein the one or more additives are selected from the group consisting of nanoclay, graphene oxide, graphene, silicon dioxide (silica), aluminum oxide, cellulose nanocrystals, carbon nanotubes, titanium dioxide (titania), diatomaceous earth, biocides, pigments, dyes, thermoplastics, and combinations thereof.

16. A method for forming a thermoset omniphobic composition, the method comprising:
(a) reacting at least one polyisocyanate, at least one amine-functional hydrophobic polymer having a glass transition temperature ($T_g$) of 50° C. or less, and at least one polyol to form a partially crosslinked reaction product; and
(b) curing the partially crosslinked reaction product to form the thermoset omniphobic composition;
wherein:
the thermoset omniphobic composition has a water contact angle in a range from 90° to 120° for a 5 µl droplet;
the thermoset omniphobic composition has an oil contact angle in a range from 1° to 65° for a 5 µl hexadecane droplet;
the thermoset omniphobic composition has a water sliding angle in a range from 1° to 30° for a 75 µl droplet; and
the thermoset omniphobic composition has an oil sliding angle in a range from 1° to 20° for a 10 µl hexadecane droplet.

17. The method of claim 1, wherein the thermoset omniphobic composition comprises:
a thermoset polymer comprising a crosslinked backbone, the crosslinked backbone comprising:
(i) first backbone segments,
(ii) second backbone segments,
(iii) third backbone segments,
(iv) urethane groups linking the first backbone segments and the third backbone segments, and
(v) urea groups linking the first backbone segments and the second backbone segments;
wherein:
the first backbone segments have a structure corresponding to at least one of a urethane reaction product and a urea reaction product from the at least one polyisocyanate,
the second backbone segments have a structure corresponding to a urea reaction product from the at least one amine-functional hydrophobic polymer having a glass transition temperature ($T_g$) of 50° C. or less,
the third backbone segments have a structure corresponding to a urethane reaction product from the at least one polyol,
the urethane groups have a structure corresponding to a urethane reaction product of the polyisocyanate and the polyol, and
the urea groups have a structure corresponding to a urea reaction product of the polyisocyanate and the amine-functional hydrophobic polymer.

* * * * *